US012387089B2

(12) United States Patent
Shao et al.

(10) Patent No.: US 12,387,089 B2
(45) Date of Patent: Aug. 12, 2025

(54) EFFICIENT NEURAL NETWORK ACCELERATOR DATAFLOWS

(71) Applicant: NVIDIA Corp., Santa Clara, CA (US)

(72) Inventors: Yakun Shao, Santa Clara, CA (US); Rangharajan Venkatesan, Sunnyvale, CA (US); Miaorong Wang, Cambridge, MA (US); Daniel Smith, Los Gatos, CA (US); William James Dally, Incline Village, NV (US); Joel Emer, Acton, MA (US); Stephen W. Keckler, Austin, TX (US); Brucek Khailany, Austin, TX (US)

(73) Assignee: Nvidia Corp., Santa Clara, CA (US)

( * ) Notice: Subject to any disclaimer, the term of this patent is extended or adjusted under 35 U.S.C. 154(b) by 937 days.

(21) Appl. No.: 17/530,852

(22) Filed: Nov. 19, 2021

(65) Prior Publication Data

US 2022/0076110 A1    Mar. 10, 2022

Related U.S. Application Data

(62) Division of application No. 16/672,918, filed on Nov. 4, 2019, now Pat. No. 11,270,197.

(Continued)

(51) Int. Cl.
| | |
|---|---|
| *G06N 3/063* | (2023.01) |
| *G06F 9/30* | (2018.01) |
| *G06F 9/38* | (2018.01) |
| *G06F 17/16* | (2006.01) |
| *G06N 3/08* | (2023.01) |

(52) U.S. Cl.
CPC ......... *G06N 3/063* (2013.01); *G06F 9/30036* (2013.01); *G06F 9/3877* (2013.01); *G06F 17/16* (2013.01); *G06N 3/08* (2013.01)

(58) Field of Classification Search
CPC .......... G06N 3/063; G06N 3/08; G06N 3/045; G06F 9/30036; G06F 9/3877; G06F 17/16; G06F 9/3001
See application file for complete search history.

(56) References Cited

U.S. PATENT DOCUMENTS

| | | |
|---|---|---|
| 5,008,833 A | 4/1991 | Agranat et al. |
| 5,091,864 A | 2/1992 | Baji et al. |

(Continued)

FOREIGN PATENT DOCUMENTS

CN    107463932 A    12/2017

OTHER PUBLICATIONS

Yavits, Leonid, Amir Morad, and Ran Ginosar. "Sparse matrix multiplication on an associative processor." IEEE Transactions on Parallel and Distributed Systems 26.11 (2014): 3175-3183. (Year: 2014).

(Continued)

*Primary Examiner* — Sanchita Roy
(74) *Attorney, Agent, or Firm* — Carnelian Law

(57) ABSTRACT

A distributed deep neural net (DNN) utilizing a distributed, tile-based architecture includes multiple chips, each with a central processing element, a global memory buffer, and a plurality of additional processing elements. Each additional processing element includes a weight buffer, an activation buffer, and vector multiply-accumulate units to combine, in parallel, the weight values and the activation values using stationary data flows.

15 Claims, 22 Drawing Sheets

Related U.S. Application Data

(60) Provisional application No. 62/817,413, filed on Mar. 12, 2019.

(56) References Cited

U.S. PATENT DOCUMENTS

| | | | |
|---|---|---|---|
| 5,297,232 | A | 3/1994 | Murphy |
| 5,319,587 | A | 6/1994 | White |
| 5,704,016 | A | 12/1997 | Shigematsu et al. |
| 5,768,476 | A | 6/1998 | Sugaya et al. |
| 6,560,582 | B1 | 5/2003 | Woodall |
| 7,082,419 | B1 | 7/2006 | Lightowler |
| 10,817,260 | B1 | 10/2020 | Huang et al. |
| 10,929,746 | B2 | 2/2021 | Litvak et al. |
| 2003/0061184 | A1 | 3/2003 | Masgonty et al. |
| 2009/0210218 | A1 | 8/2009 | Collobert et al. |
| 2018/0004689 | A1 | 1/2018 | Marfatia et al. |
| 2018/0046897 | A1 | 2/2018 | Kang et al. |
| 2018/0046916 | A1* | 2/2018 | Dally .................. G06F 7/523 |
| 2018/0121796 | A1 | 5/2018 | Deisher et al. |
| 2018/0173676 | A1 | 6/2018 | Tsai et al. |
| 2019/0050717 | A1 | 2/2019 | Temam et al. |
| 2019/0138891 | A1 | 5/2019 | Kim et al. |
| 2019/0179975 | A1 | 6/2019 | Rassekh et al. |
| 2019/0180170 | A1 | 6/2019 | Huang et al. |
| 2019/0340510 | A1 | 11/2019 | Li et al. |
| 2019/0370645 | A1 | 12/2019 | Lee et al. |
| 2019/0392287 | A1 | 12/2019 | Ovsiannikov et al. |
| 2021/0004668 | A1 | 1/2021 | Moshovos et al. |
| 2021/0125046 | A1 | 4/2021 | Moshovos et al. |

OTHER PUBLICATIONS

Angshuman Parashar et al. "SCNN: An Accelerator for Compressed-sparse Convolutional Neural Networks", (Year: 2017).

Duckhwan Kim et al. "Neurocube: A Programmable Digital Neuromorphic Architecture with High-Density 3D Memory", (Year: 2016).

Eunhyeok Park et al. "Energy-efficient Neural Network Accelerator Based on Outlier-aware Low-precision Computation", Jun. 1, 2018 (Year: 2018).

U.S. Appl. No. 16/517,431, filed Jul. 19, 2019, Yakun Shao.

Andri, YodaN N: An Ultra-Low Power Convolutional Neural Network Accelerator Based on Binary Weights, IEEE, pp. 238-241 (Year: 2016).

Han, EIE: Efficient Inference Engine on Compressed Deep Neural Network, IEEE, pp. 243-254 (Year: 2016).

Kartik Hegde et al. "UCNN: Exploiting Computational Reuse in Deep Neural Networks via Weight Repetition" ,Apr. 18, 2018. (Year: 2018).

Streat, Lennard, Dhireesha Kudithipudi, and Kevin Gomez. "Non-volatile hierarchical temporal memory: Hardware for spatial pooling." arXiv preprint arXiv:1611.02792 (2016). (Year: 2016).

F. Sijstermans. The NVIDIA deep learning accelerator. In Hot Chips, 2018.

K. Kwon et al. Co-design of deep neural nets and neural net accelerators for embedded vision applications. In Proc. DAC, 2018.

N. P. Jouppi et al. In-datacenter performance analysis of a tensor processing unit. In Proc. ISCA, 2017.

T. Chen et al. DianNao: A small-footprint high-throughput accelerator for ubiquitous machine-learning. In Proc. ASPLOS, 2014.

W. Lu et al. FlexFlow: A flexible dataflow accelerator architecture for convolutional neural networks. In Proc. HPCA, 2017.

Y. Chen, J. Emer, and V. Sze. Eyeriss: A spatial architecture for energy-efficient dataflow for convolutional neural networks. In Proc. ISCA, 2016.

* cited by examiner

WC=1, AC=0

```
1   for k1 = [0: K1):
2    for r = [0: R):
3     for s = [0: S):
4      for c1 = [0: C1):
5       // Weight Stationary
6       for p1 = [0: P1):
7        for q1 = [0: Q1):
8
9            Vector MACs
```

(h,w) = f(p,q,r,s)
Out[p][q][k] +=
Weight[r][s][k][c]*
Input[h][w][c]

```
1   for k1 = [0: K1):
2    for p1 = [0: P1):
3     for q1 = [0: Q1):
4     // Output Stationary
5      for r = [0: R):
6       for s = [0: S):
7        for c1 = [0: C1):
8
9           Vector MACs
```

(h,w) = f(p,q,r,s)
Out[p][q][k] +=
Weight[r][s][k][c]*
Input[h][w][c]

```
1  for h1 = [0: H1):
2    for w1 = [0: W1):
3      for c1 = [0: C1):
4        // Input Stationary
5        for k = [0: K1):
6          for r = [0: R):
7            for s = [0: S):
8
9              Vector MACs
```

(p,q) = f(h,w,r,s)
Out[p][q][k] +=
Weight[r][s][k][c] *
Input[h][w][c]

WC=C0, AC=1, IC=0

```
1   for k1 = [0: K1):
2    for r = [0: R):
3     for s = [0: S):
4      for c1 = [0: C1):
5       // WS
6       for p1 = [0: P1):
7        for q1 = [0: Q1):
8         // LOS
9         for c0 = [0: C0):
10          Vector MACs
```

(h,w) = f(p,q,r,s)
Out[p][q][k] +=
Weight[r][s][k][c]*
Input[h][w][c]

```
1   for k1 = [0: K1):
2     for p1 = [0: P1):
3       for q1 = [0: Q1):
4         // OS
5         for r = [0: R):
6           for s = [0: S):
7             for c1 = [0: C1):
8               // LWS
9               for q0 = [0: Q0):
10                Vector MACs
```

(h,w) = f(p,q,r,s)
Out[p][q][k]   +=
Weight[r][s][k][c] *
Input[h][w][c]

FIG. 16

EFFICIENT NEURAL NETWORK ACCELERATOR DATAFLOWS

CROSS-REFERENCE TO RELATED APPLICATIONS

This application claims priority and benefit under 35 U.S.C. 119 (e) to U.S. Application Ser. No. 62/817,413, filed on Mar. 12, 2019, the contents of which are incorporated herein by reference in their entirety.

GOVERNMENT LICENSE RIGHTS

This invention was made with US Government support under Agreement HR0011-16-3-0003, awarded by DARPA. The US Government has certain rights in the invention.

BACKGROUND

Deep neural networks (DNNs) are a class of neural network that has emerged as a key approach for solving complex problems across various technical fields. "Neural network" refers to an algorithm or computational system based on a collection of connected units or nodes called artificial neurons, which loosely model the neurons in a biological system. Each connection between neurons, like the synapses in a biological brain, can transmit a signal (an activation) from one artificial neuron to another. An artificial neuron that receives a signal (the input activation) can process it and then signal additional artificial neurons (the output activation) connected to it. Applications of DNNs have diverse performance, accuracy, and power requirements depending on the implementation. Building dedicated DNNs for the requirements of particular implementations may be cost prohibitive due to high design complexity and manufacturing challenges.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 12 depicts a weight-stationary data flow 1200 in accordance with one embodiment.

FIG. 13 depicts an output-stationary data flow 1300 in accordance with one embodiment.

FIG. 15 depicts a weight-stationary-local-output-stationary data flow 1500 in accordance with one embodiment.

FIG. 16 depicts an output-stationary-local-weight-stationary data flow 1600 in accordance with one embodiment.

DETAILED DESCRIPTION

Figure 1:
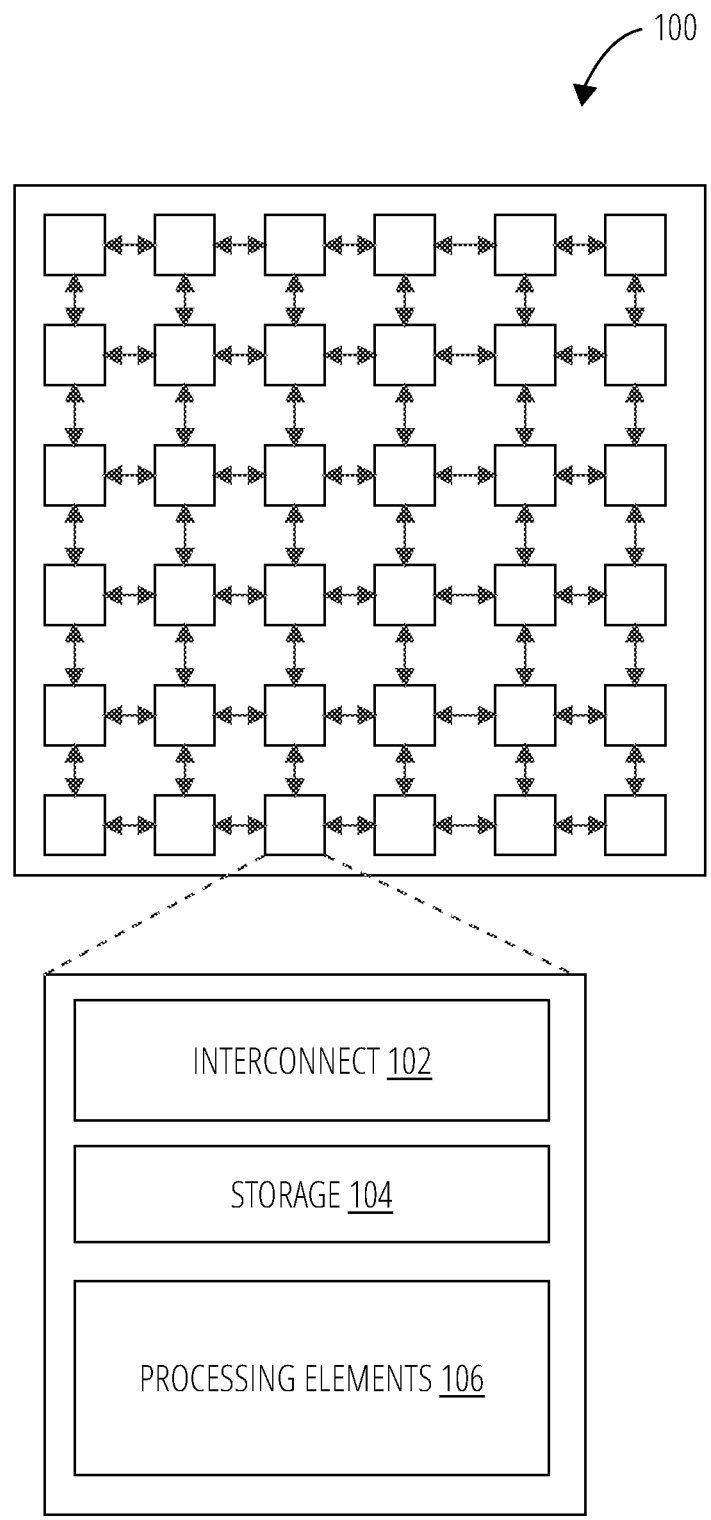
FIG. 1 depicts a scalable neural network processor 100 in accordance with one embodiment.

Disclosed herein is an efficient, tiled DNN processor that utilizes a scalable design. The disclosed system comprises beneficial features including: 1) a fully distributed, tile-based architecture, 2) flexible and efficient weight and activation tiling at the processing element (PE) level, chip-level, and in some embodiments, package-level, improving data locality and reducing communication cost, and 3) multi-level dataflows, improving the data reuse and energy efficiency.

The architecture utilizes a data path designed to account for the low computation-to-memory ratio of neural network layers. The data path includes, in some implementations, both local and global processing elements. Each local processing element comprises logic to perform localized multiply-accumulation of weights and input activations, and post-processing such as ReLu, MaxPool, etc. Memory buffers in the form of collectors and register files may be disposed into the data path within and/or between processing elements.

The architecture provides multi-level memory and computation hierarchy that exploits both weight and output activation locality to improve the energy efficiency of neural network execution. Conventional neural network accelerator designs only leverage the reuse opportunity of the innermost execution level (e.g., loop), whereas the disclosed architecture provides a multi-level memory and processing hierarchy to exploit data reuse opportunities across multiple loop levels, thus enabling a diverse set of energy-efficient data flows. For example, instead of capturing temporal reuse only for weights or outputs, multi-level dataflows may be implemented that exploit both weight and partial sum reuse during the execution.

To efficiently implement a particular data flow, each local processing element may utilize one or more collectors (e.g., small register-files): one in front of a weight buffer, another one in front of an accumulation buffer, and another in front of an input activation buffer. These collectors filter out (reduce) expensive reads and writes to the weight and partial sum buffers (e.g., SRAMs), leading to an overall energy efficiency improvement. The global processing elements and/or the chip may provide additional storage (e.g., a global or shared register file) and processing capability in the data path of neural network computations.

The disclosed architecture provides a heterogeneous-tile-based computational platform for different types neural network calculations. In addition to dense convolution, many neural networks perform element-wise calculation and depth-wise convolution. To facilitate such computations the architecture includes two general types of processing element. The first type, called local processing elements, specialize in executing dense convolution with significant data reuse. The second type, called global processing elements, provide second-level storage for the local processing elements during dense convolution. In addition, the global processing elements may perform element-wise operations and depth-wise convolution at a low compute-to-memory ratio without communicating large amounts of data through layers of the neural network.

FIG. 1 illustrates a scalable neural network processor 100 in one embodiment. Weights for a deep neural network are tiled spatially across on-die memories (storage 104) via an interconnect 102. "Weights" refers to values with which activations are multiplied to increase or decrease the impact of the activation values in an activation function. Herein the terms "die" and "chip" are used interchangeably. Each chip/die comprises of one or more (typically multiple) processing elements 106. The weights may be partitioned among any number of chips (dice), for example 1-36 dice. As depicted, FIG. 1 comprises 36 dice. The scalable neural network processor 100 may be implemented by multiple dice in a single package/device/printed circuit board, or across multiple packages/devices/printed circuit boards.

Deep neural network applications can differ significantly in their requirements. For example, typical data center inference applications such as image recognition may prioritize performance and scalability at low latency and may be willing to sacrifice classification accuracy, while inference for autonomous driving workloads may prioritize energy efficiency within real-time constraints while maintaining the best achievable network accuracy. Because application-specific inference accelerators can provide significant performance and power advantages compared to general-purpose solutions, it is desirable to enable custom solutions on a common architecture for different target markets and applications.

Figure 2:
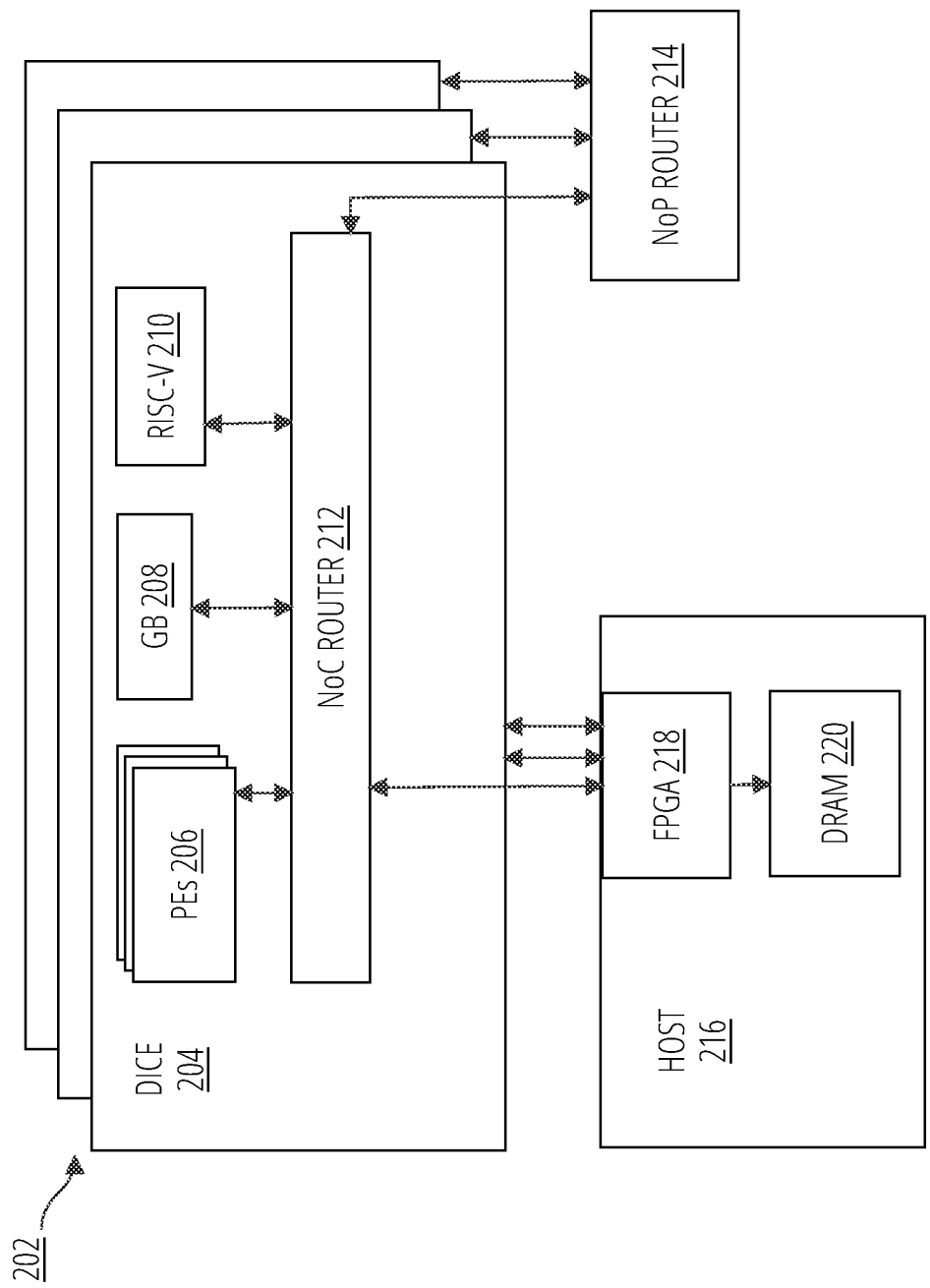
FIG. 2 depicts a multi-die package 202 in accordance with one embodiment.

A multi-die package 202 embodiment for implementing a DNN accelerator is depicted in FIG. 2. The multi-die package 202 may be a semiconductor package comprising a plurality of dice 204 (chips). Each of the dice 204 comprises a plurality of processing elements 206, a global buffer 208, and a controller 210 (e.g., an open-source RISC-V processor). The elements of each chip/die communicate via a network-on-a-chip router 212. The multiple chips in a package communicate with one another via a network-on-a-package router 214, and may also communicate with a host 216 system comprising DRAM 220 or other memory, via a Field Programmable Gate Array (FPGA 218), Joint Test Action Group (JTAG) logic, or other interface technology as known in the art.

Some or all of the processing elements are local processing elements comprising a weight buffer to receive and store weight values for a deep neural network. "Weight buffer" refers to a buffer storing weight values. The local processing elements comprise an activation buffer to receive activation values for the deep neural network. "Activation buffer" refers to a memory buffer utilized to store activation values (activations) utilized in a neural network computation. Activations are computed by each neuron in a neural network layer using an activation function, also sometimes called a 'transfer function'. Activations may be simple binary values (e.g., "1" or "O" representing "ON" or "OFF") or they may take on a range of values for some activation functions. The weight buffer and activation buffer may be separate elements within each processing element. "Activations" refers to the output values of neurons in a neural network, computed based at least in part on weights input to the neuron and an activation function of the neuron. Activations are also called 'activation values'. "Buffer" refers to a memory storing values that are inputs to or results from a calculation. The local processing elements further comprise a plurality of multiply-accumulate units to combine, in parallel, the weight values and the activation values, to generate partial sums.

The multi-die package 202 may be configured to distribute the weight values and the activation values among the local processing elements spatially and temporally (over time). The global memory buffer of each chip may act as a second-level buffer for the activation values during computation. "Second-level buffer" refers a memory where values are stored and retrieved from when the values are needed for computation but are not available in the first-level buffer. Herein, the chip global buffer may act as a second-level buffer to the first-level activation buffers of the chip's processing elements. "Global memory buffer" refers to a buffer available for utilization by all or at least a plurality of processing elements on a chip. The distribution of weights and activations during computation may be carried out by the chip's controller 210. The controller 210 or local controllers of any of the processing elements 206 may be configured by instructions stored in a memory to carry out various data flows described below. A memory configured in such a manner may conveniently be referred to herein as "logic". The location of such logic is a design choice. The memory storing such instructions may be any of the memories depicted in the figures, or a different memory not depicted.

Figure 3:
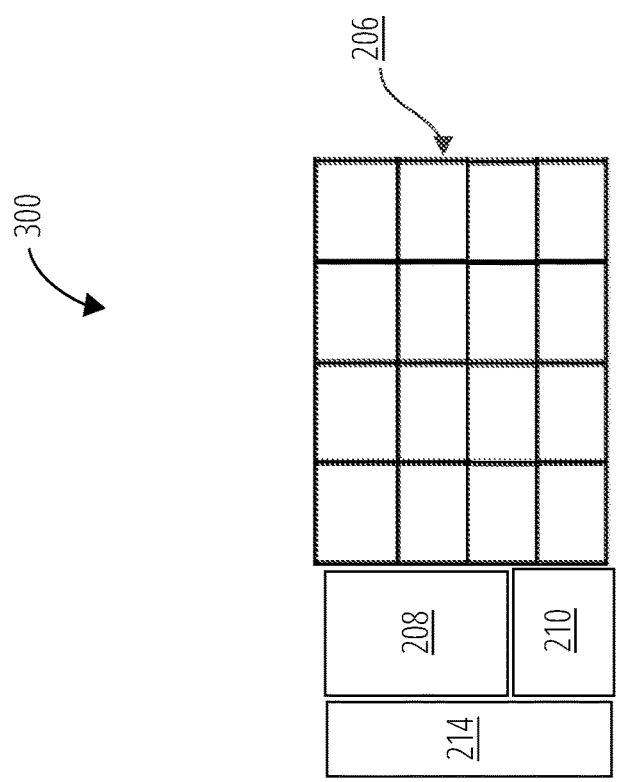
FIG. 3 depicts a neural network processor 300 implemented on a single chip in accordance with one embodiment.

FIG. 3 depicts a neural network processor 300 embodied on a single chip. The neural network processor 300 may utilize a fixed point data path between a plurality of processing elements 206. The neural network processor 300 also comprises the aforementioned global buffer 208 and controller 210, which for example may be a RISC-V processor. The processing elements 206 and global buffer 208 communicate via the network-on-a-chip router 212 or other interconnect technology (see the GPU implementations, described further below). If a router is utilized, it may be implemented centrally or in distributed fashion as routers on each of the processing elements 206. The processing elements 206 utilize the router/interconnect to communicate with processing elements on the same package, or in some embodiments across packages via a network-on-a-package router 214.

Figure 4:
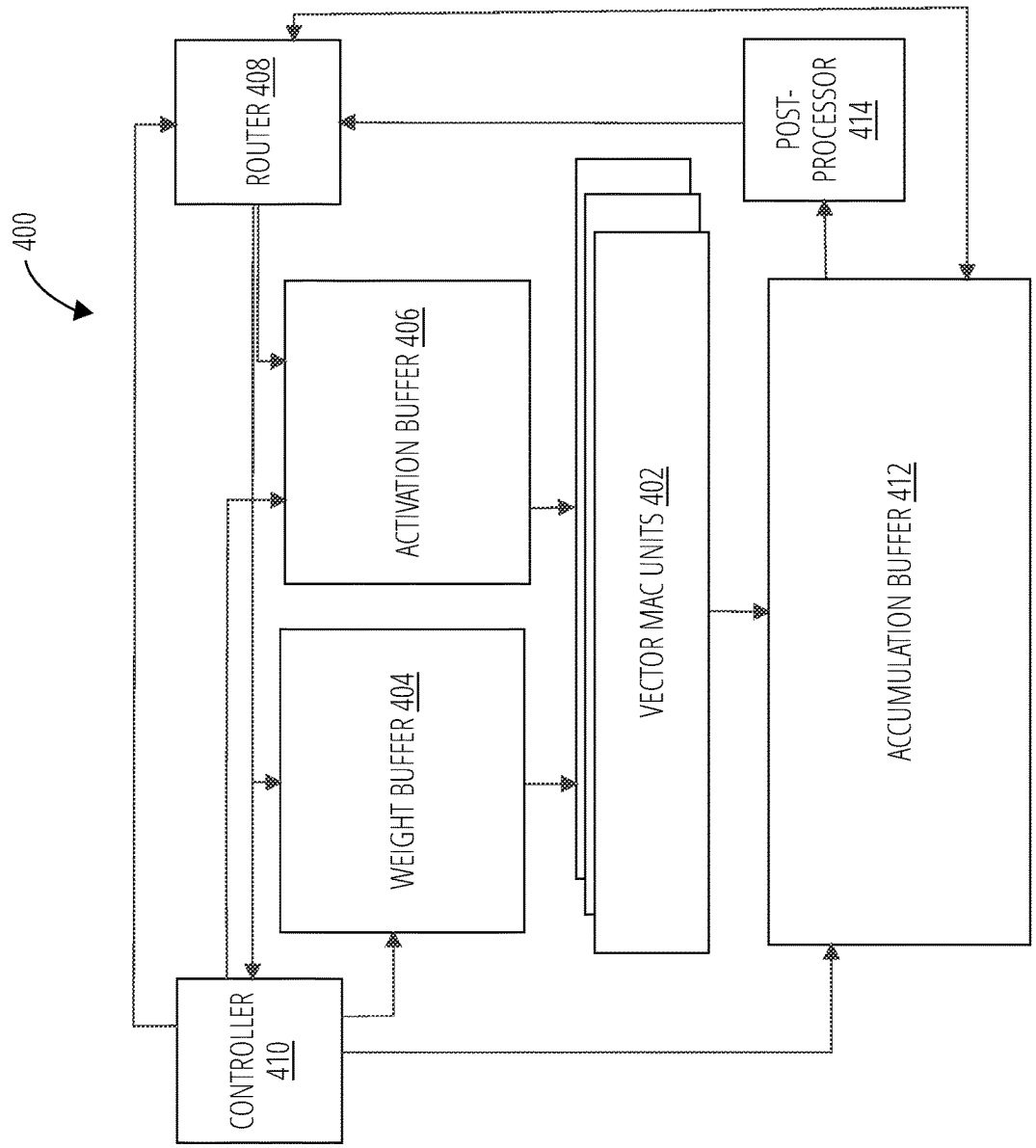
FIG. 4 depicts a local processing element 400 in accordance with one embodiment.

FIG. 4 depicts, and a high level, an exemplary local processing element 400. The processing element 400 includes a plurality of vector multiply-accumulate units 402, a weight buffer 404, an activation buffer 406, a router 408, a controller 410, an accumulation memory buffer 412, and a post-processor 414. The activation buffer 406 may, in one embodiment, be implemented as a dual-ported SRAM to receive activation values from the global buffer 208 or from other local or global processing elements, via the router 408 or other interconnect. The router 408 may be a component of a distributed network-on-a-chip router 212 that in one embodiment comprises a serializer/de-serializer, packetizer, arbitrator, Advanced extensible Interface, and other components known in the art.

The weight buffer 404 may, in one embodiment, be implemented as a single-ported SRAM storing weigh values. The weight values used by the vector multiply-accumulate units 402 may be "weight-stationary", meaning they are not updated each clock cycle, but instead are updated only after the output activation values are computed for a particular layer of the deep neural network.

The accumulation memory buffer 412 may comprise one or more SRAM devices to store the output activations computed by the vector multiply-accumulate units 402. The router 408 communicates these output activations and control signals from the processing element 400 to other processing elements. "Output activation" refers to an activation output by a neuron in a neural network. An output activation is typically computed based on the input activations to the neuron and the weights applied to the input activations. "Input activation" refers to an activation received by a neuron in a neural network.

The processing element 400 may perform all operations of convolutional and fully-connected layers of a DNN efficiently, including multiply-accumulate, truncation, scaling, bias addition, ReLU, and pooling (these last five in the post-processor 414). The vector multiply-accumulate units 402 may operate on the same inputs using different filters. In one embodiment, each of the vector multiply-accumulate units 402 performs an eight-input-channel dot product and accumulates the result into the accumulation memory buffer 412 on each clock cycle. The weights stored in the weight buffer 404 are unchanged until the entire computation of output activations completes. Each processing element 400 reads the input activations in the activation buffer 406, performs the multiply-accumulate operations, and writes output activations to the accumulation memory buffer 412 on every clock cycle. The frequency at which the weight buffer 404 is accessed depends on the input activation matrix dimensions and the number of filters utilized.

The vector multiply-accumulate units 402 of each processing element 400 computes a portion of a wide dot-product-accumulate as a partial result and forwards the partial result to neighboring processing elements. "Dot-product-accumulate" refers to the computation of a dot product. A dot product is the sum of the products of the corresponding entries of the two sequences (vectors) of numbers. Dot products are efficiently computed using vector multiply-accumulate units. "Multiply-accumulate unit" refers to a data processing circuit that carries out multiply-accumulate operations, which involve computing the product of two numbers and adding that product to an accumulator. Multiply-accumulate units may be referred to herein by their acronym, MAC or MAC unit. A multiply-accumulate unit carries out computations of the form $a \leftarrow a+(b*c)$. A vector multiply-accumulate unit computes the product of two vectors using an array of multipliers, then performs a reduction operation by adding all the outputs of multipliers to produce a partial sum, which is then added to an accumulator.

The partial results are transformed into a final result by the post-processor 414 and communicated to the global buffer 208. The global buffer 208 acts as a staging area for the final multiply-accumulate results between layers of the deep neural network.

The accumulation memory buffer 412 receives outputs from the vector multiply-accumulate units 402. The central controller 210 distributes the weight values and activation values among the processing elements and utilizes the global memory buffer as a second-level buffer for the activation values. When processing images, the controller 210 configures processing by layers of the deep neural network spatially across the processing elements by input/output channel dimensions and temporally by image height/width.

The global buffer 208 stores both input activations and output activations from the processing elements 206 for distribution by the aforementioned transceivers to the processing elements via multicast. "Multicast" refers to a group communication mechanism whereby transmission of data is addressed to a group of destination devices (e.g., processing elements) simultaneously. Multicast can implement one-to-many or many-to-many distribution. Each of the processing elements 206 includes a router 408 to communicate, in one embodiment, 64 bits of data in, and 64 bits of data out, per clock cycle. This enables accumulation of partial sums for wide dot products that have their computation spatially tiled across the processing elements 206.

Figure 5:
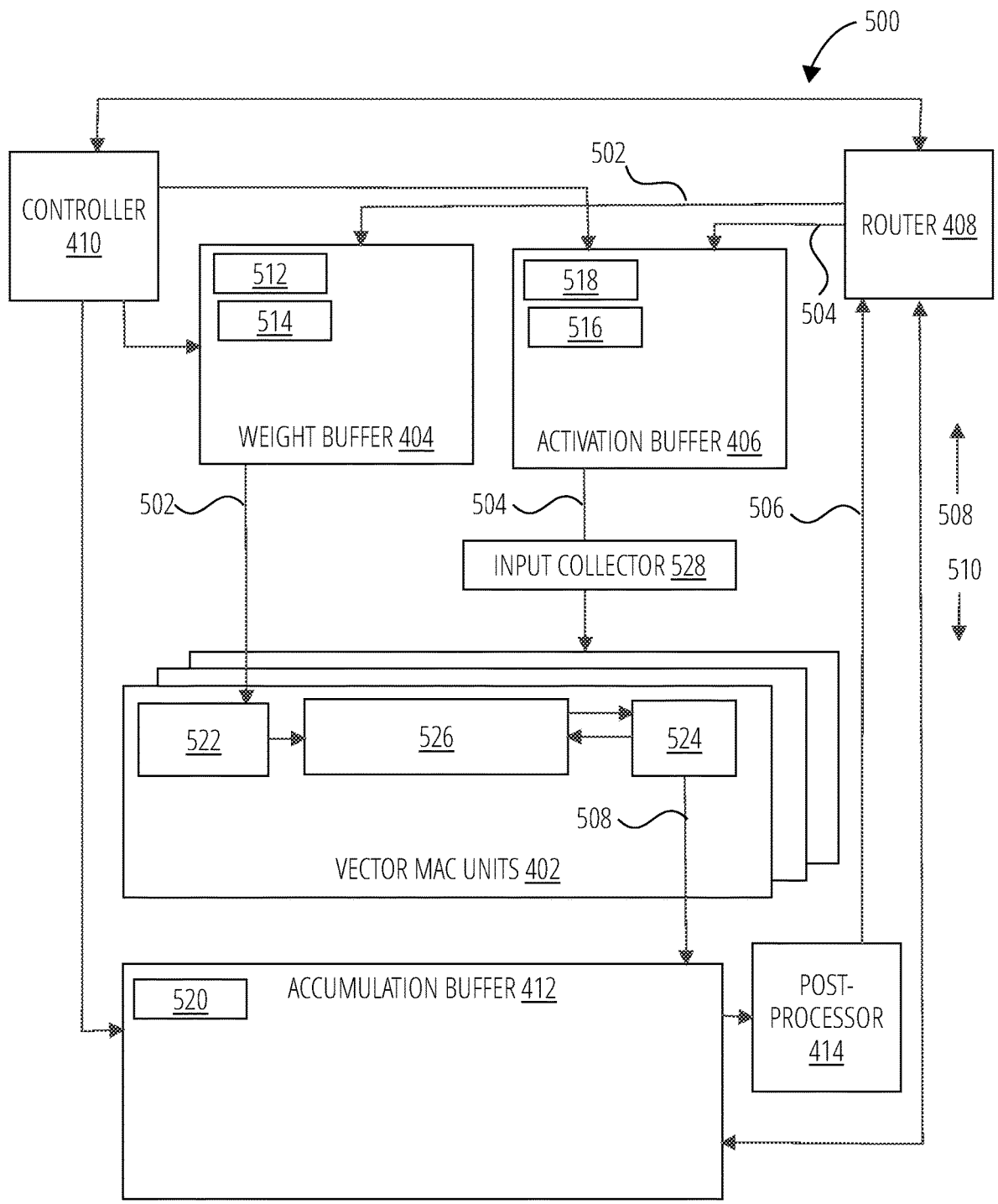
FIG. 5 depicts a local processing element 500 in more detail, in accordance with one embodiment.

FIG. 5 depicts an exemplary local processing element 500 in more detail. The processing element 500 includes the aforementioned vector multiply-accumulate units 402, weight buffer 404, activation buffer 406, router 408, controller 410, accumulation memory buffer 412, and post-processor 414 (e.g., the post-processor 414). Also depicted are a weight collector 522 interposed between the weight buffer 404 and the vector multiply-accumulate units 402, and an accumulation collector 524 interposed between the vector multiply-accumulate units 402 and the accumulation memory buffer 412. The accumulation collector 524 may also be referred to herein as an "output collector". Also depicted are various memory buffer managers that may be utilized (e.g., weight memory buffer manager 512, activation memory buffer manager 518, and accumulation memory buffer manager 520). "Memory buffer manager" refers to logic for managing the contents of a memory buffer, for example managing the availability of certain data (e.g., weights, activations) in the buffer when requested by a processing element.

The processing element 500 includes vector multiply-accumulate units 402 of which a number N are operational for a given data flow. Each vector multiply accumulate unit 526 performs V multiplications and additions per clock cycle. Thus, in every clock cycle, the processing element 500 can multiply a weight matrix of dimensions N×V with an input activation vector of size V, to generate a partial-sum vector of size N. In other words, each of the vector multiply-accumulate units 402 can perform a V-wide dot product calculation per clock cycle. One or both N and V may be configurable at the controller 210.

The input activation buffer 406 has an operational size IA and the weight buffer 404 has an operational size W. One or both W and IA may be configurable at the controller 210. The accumulation memory buffer 412 has an operational size of A. "Operational size" refers to a resource pool available for performing calculations during operation of a device, which may be less than the total or maximum size of the resource pool. The operational size may be configurable using registers or other settings (e.g., for higher performance or less power consumption).

Each of the vector multiply-accumulate units 402 includes a weight collector 522 buffer having a configurable depth (e.g., number of distinct registers or addresses in a register file used by the vector multiply-accumulate units 402 during computations) of WD and a width V×WP (WP is also called the weight precision). Across the N vector multiply-accumulate units 402, the total weight collector width is VxNxWP. The input activations have width IAP. Each of the vector multiply-accumulate units 402 also includes an accumulation collector 524 having a configurable operational depth AD and width AP (AP is also called the accumulator precision). The accumulation collector 524 has a total width of NxAP across the N vector multiply-accumulate units 402. The V-wide dot products and N-sized partial-sum vector may thus be computed by each vector multiply accumulate unit 526 at mixed precision. Some or all of WD, WP, IAP, AD, and AP may be configurable by the controller 210.

The weight buffer 404 read (output) port is WPxNxV bits wide and is able to supply different weight vectors to different ones of the vector multiply-accumulate units 402. The activation buffer 406 is IAPxV bits wide because the same IA vector is provided in parallel to all N vector multiply-accumulate units 402.

The values of V and N may be adjusted for more or less parallelism and reuse of weights, for example. Based on the configuration of N and V, other parameters such as W, IA, and A may be adjusted to ensure the vector multiply-accumulate units 402 stay busy during convolution calculation.

The weight buffer 404 and the activation buffer 406 each have an associated address generator (address generator 514 and address generator 516, respectively) that generates an address every cycle. "Address generator" refers to logic that calculates address values in a memory for reading or writing data from the address. The ordering of operations carried out by the vector multiply-accumulate units 402 is controlled by these address generators, which are configurable to support temporal reuse of weights or results in the accumulation collector 524 across clock cycles for different types of data flows. The depth WD of the weight collector 522 may be configurable to enable different amounts of temporal reuse of partial sum values, depending on the requirements of the data flow. Likewise, the depth AD of the accumulation collector 524 may be configurable to enable different amounts of temporal reuse of weight values, depending on the requirements of the data flow.

The processing element 500 may further comprise an input collector 528 disposed between the activation buffer 406 and the vector multiply-accumulate units 402. An operational depth IC of the input collector 528 may be configured to set different levels of input activation stationary data flows, as described further below.

Each of the weight buffer 404 and activation buffer 406 also have a buffer manager (weight memory buffer manager 512 and activation memory buffer manager 518, respectively) responsive to the controller 410 and determining the availability of data to the vector multiply-accumulate units 402. The dimensions of the address generators and the granularity of data movement from the weight buffer 404 and activation buffer 406 to the vector multiply-accumulate units 402 may in some embodiments be configurable at the controller 210.

The accumulation memory buffer 412 stores partial sums from all N vector multiply-accumulate units 402 and may be optimized to perform read-modify-write operations every cycle. Partial sums from the N vector multiply-accumulate units 402 are packed into vectors of width APxN and stored in the accumulation memory buffer 412. From there, they can be sent either directly to another processing element for cross-processing element reduction or to the post-processor 414 to produce final output activations. The post-processor 414 supports not only scaling and quantization but also ReLU and pooling operations to enable layer fusion.

Input weights 502 arrive over the router 408 and are stored in the weight buffer 404. Input activations 504 also arrive over the router 408 and are stored in the activation buffer 406. Computed output activations 506 (after post-processing by the post-processor 414) or partial sums 508 from the accumulation memory buffer 412 are output to the global buffer 208 or neighboring processing elements, respectively, via the router 408. Cross-processing-element reductions 510 from said neighboring processing elements may be received by the router 408 and are accumulated in the accumulation memory buffer 412.

Figure 6:
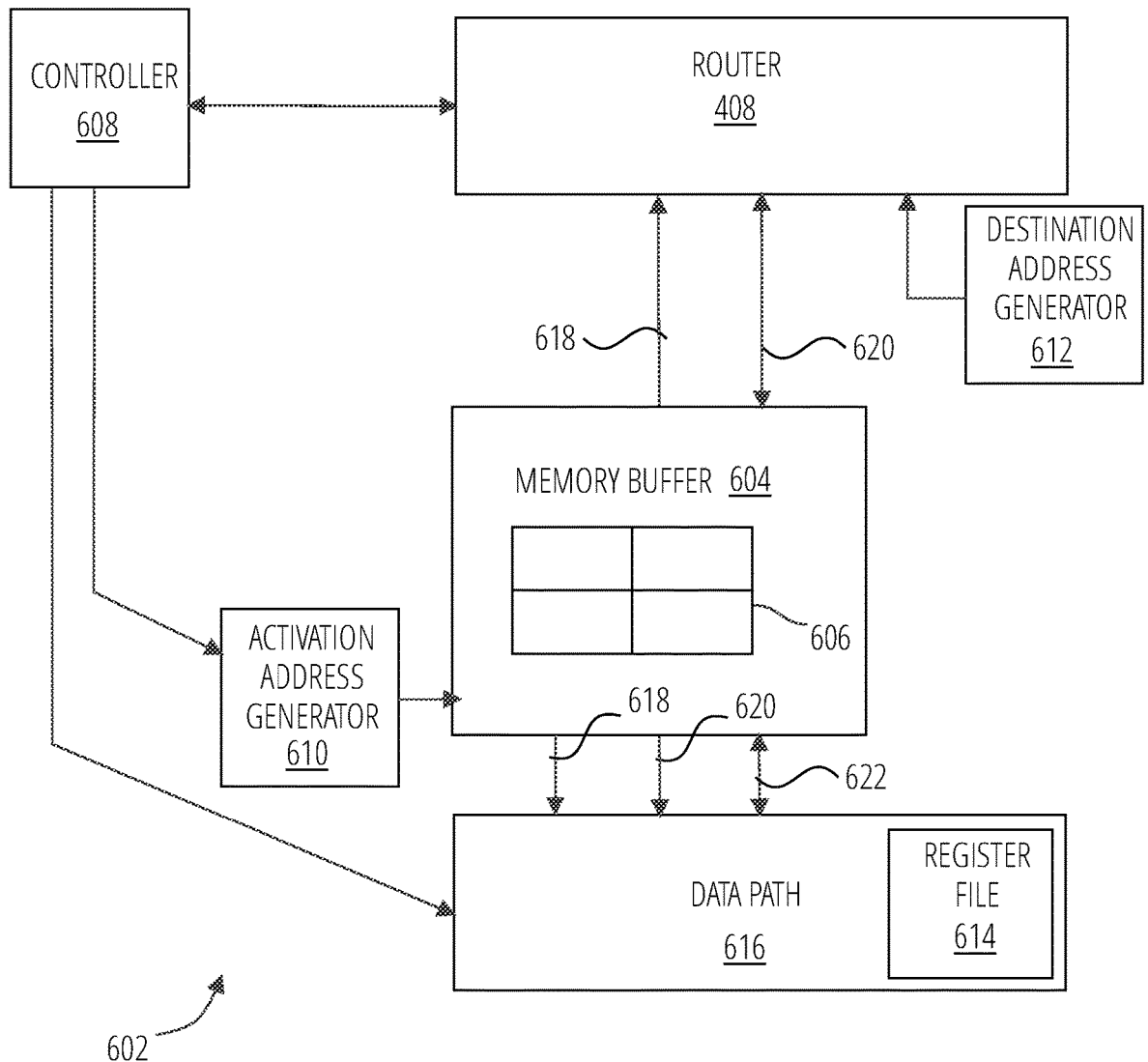
FIG. 6 depicts a global processing element 602 in accordance with one embodiment.

FIG. 6 illustrates the global processing element 602 in one embodiment. The global processing element 602 comprises a global memory buffer 604 with arbitrated memory banks 606 (e.g., a "scratchpad"), a controller 608 to carry out calculations on data in the arbitrated memory banks 606, and an activation address generator 610 and a destination address generator 612 to generate source and destination addresses, respectively, for calculations. The global processing element 602 communicates with other processing elements via the router 408.

The data path 616 to and from the global memory buffer 604 comprises a register file 614 which may operate as a collector for one or more of input activations 618, output activations 620, and partial sums 622 to and from local processing elements, according to the requirements of the data flow.

Many neural networks utilize computations such as element-wise calculation and depth-wise convolution for improved overall accuracy. Local processing elements are specialized for executing dense convolution with significant data reuse. The global buffer 208 may be utilized as the second-level data storage by local processing elements during dense convolution and may also perform computation for element-wise operations and depth-wise convolution. Global processing elements execute computation with low compute-to-memory ratio locally without communicating the data through layers (and hence, chips) of the neural network.

The controller 608 may be local to each global processing element 602 or may be implemented by the chip master controller (controller 210). Likewise, the global memory buffer 604 may be local to the global processing element 602 or implemented by the global buffer 208.

The neural network processor 300 leverages the locality of DNN algorithms to flexibly implement different data flows using a plurality of local processing elements and optionally one or more global processing elements. Computation by the DNN layers may be tiled both spatially and temporally across multiple processing elements 206 to maximize utilization of the vector multiply-accumulate units 402, maximize performance, minimize power consumed, or any balance of these factors, depending on the requirements of the implementation. The particular tiling and data flow may be determined by setting one or more of the configurable values discussed previously in conjunction with FIG. 5.

Figure 7:
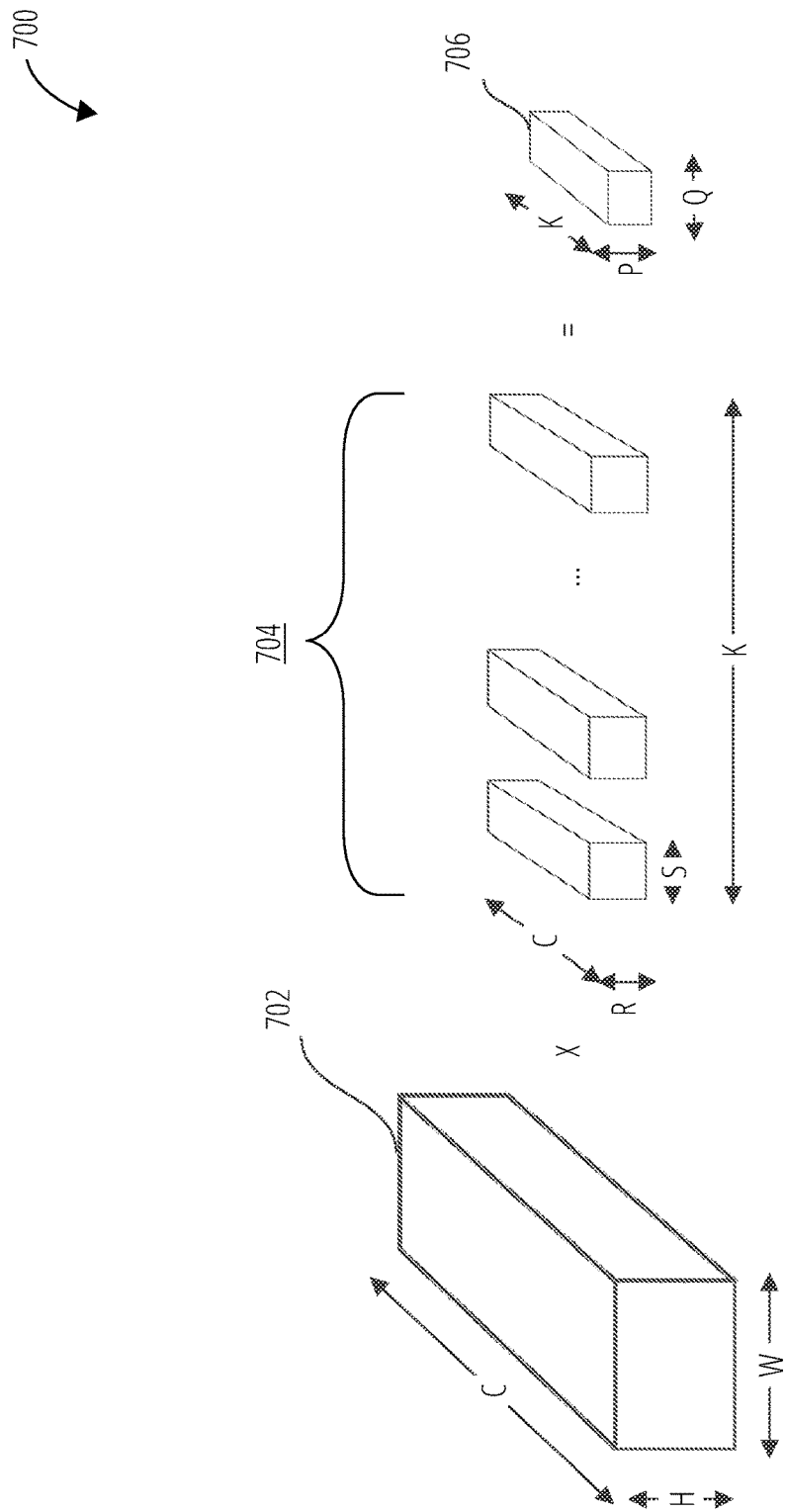
FIG. 7 depicts convolution 700 in accordance with one embodiment.
Figure 8:
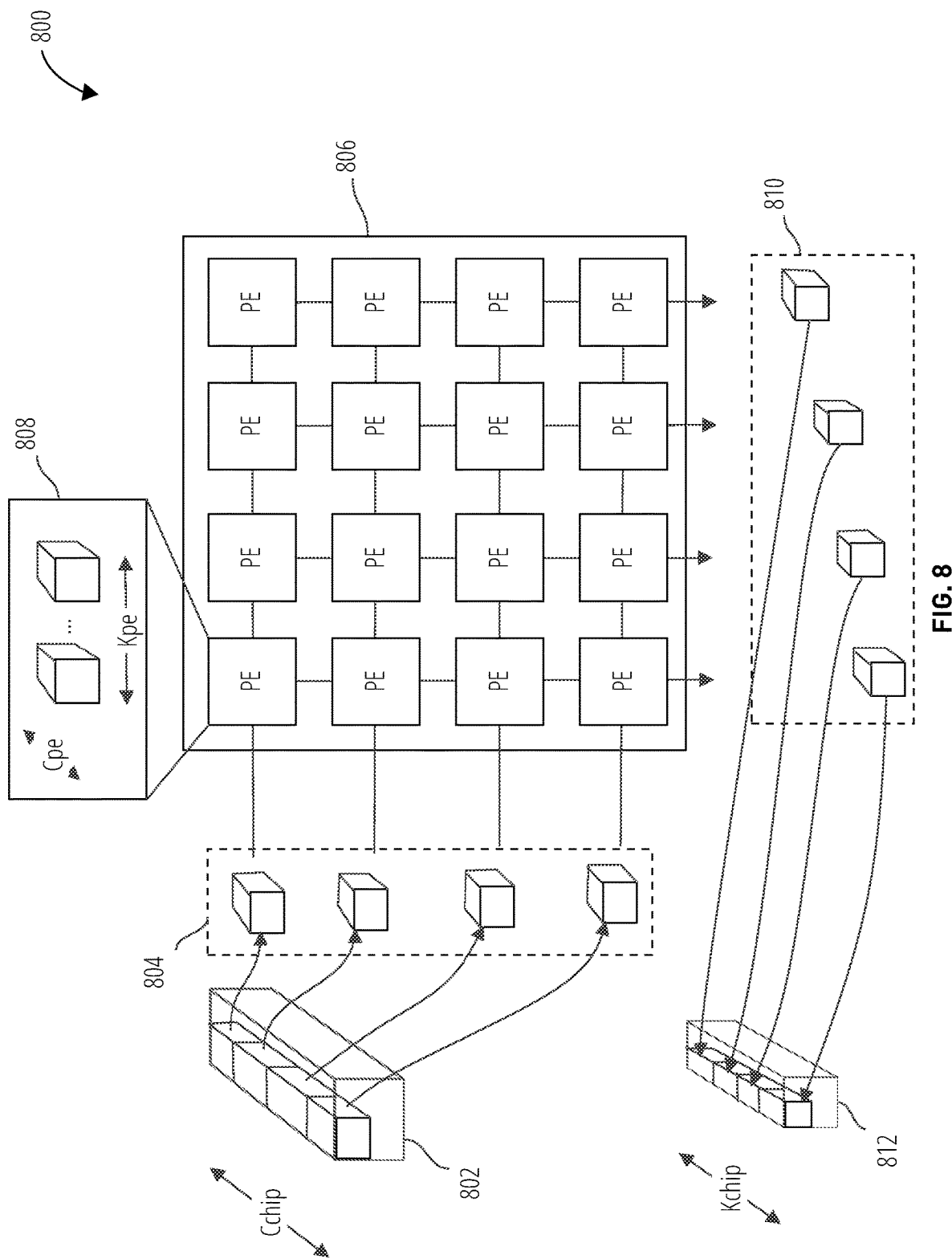
FIG. 8 depicts a chip-level tiling 800 in accordance with one embodiment.
Figure 9:
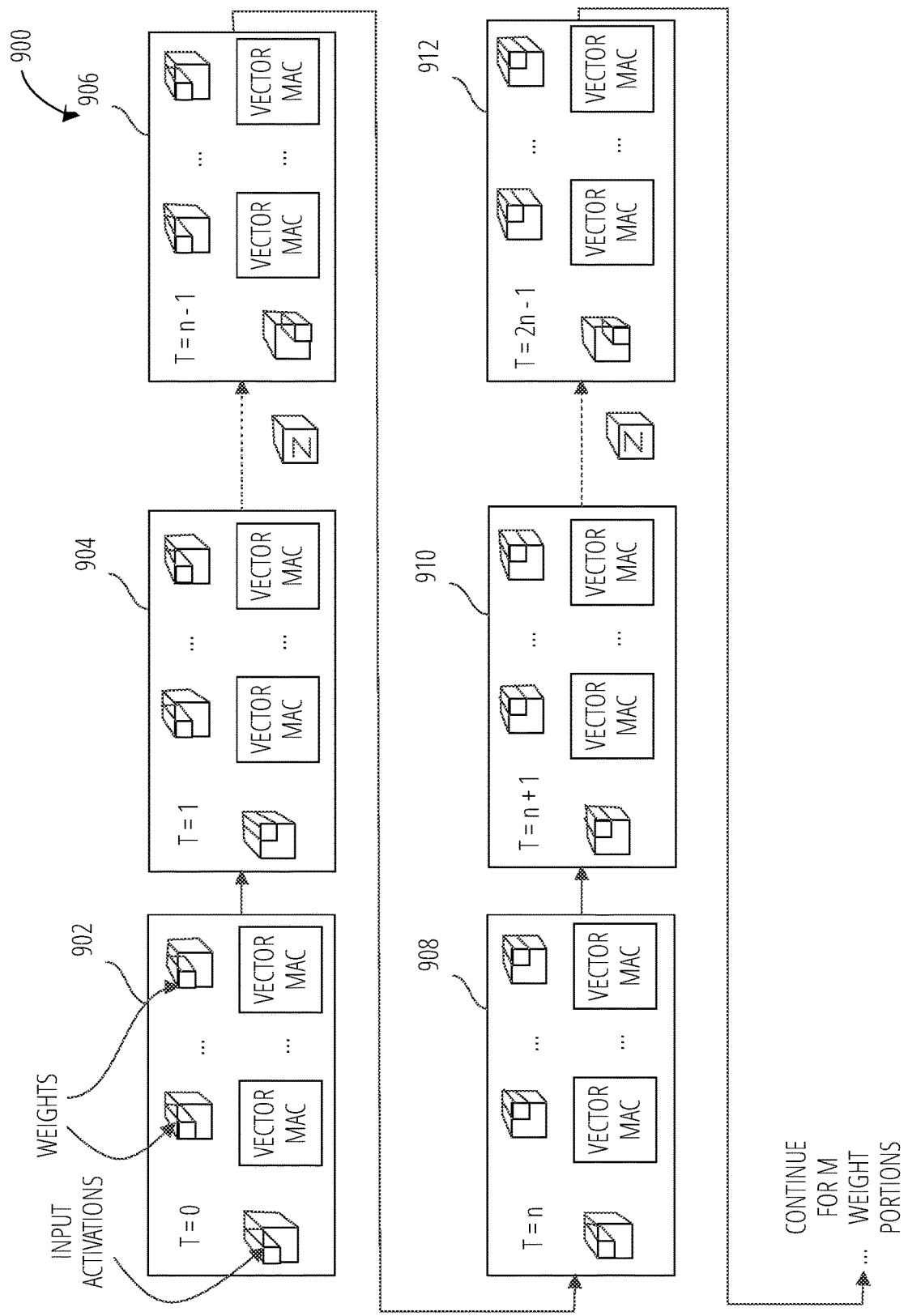
FIG. 9 depicts a processing element-level tiling 900 in accordance with one embodiment.

FIG. 7 through FIG. 9 depict an embodiment of convolution 700 that may be utilized. This depiction is merely one example to illustrate the flexibility of the tiling possibilities.

Generally, convolution of the input activations 702 with the weight tensors 704 is performed to generate the output activations 706. The input activations 702 may have a number of input channels, C, as well as an input activation size, HxW. The height, H, and the width, W, may be image pixel dimensions. The depth of the input to the multi-die package 202 (e.g., color depth of an image) may be the channel dimension of the input, C. Each of the weight tensors 704 may have C input channels and a weight kernel size, R×S. The number of weight tensors 704 may equal the number of output channels, K. The output activations 706 may have a number of output channels, K, as well as output activation dimensions, P×Q. In a multi-die package 202 embodiment, data may be distributed as follows: 1) weights are distributed between different dice along the input channel dimensions (C) and the output channel dimensions (K); 2) input activations are multicast along processing element rows of dice having a matching C dimension; and 3) output activations are reduced along processing element columns of dice. Within each die, weights are tiled similarly along the C and K dimensions of the processing elements 206. Input activations are multicast via the network-on-a-chip router 212. In addition to the C-K tiling illustrated in FIG. 7, the multi-die package 202 may also implement H-W tiling for network layers with a smaller number of input/output channels.

Referring to FIG. 8, a chip-level tiling 800 comprises a chip input activation 802, processing element input activations 804, a chip 806, processing element weights 808, processing element output activations 810, and a chip output activation 812.

The chip 806 may receive a number of processing element input activations 804, from the chip input activation 802. The number $C_{chip}$ corresponds to the number of input channels the chip input activation 802. The number $K_{chip}$ corresponds to the number of output channels in the chip output activation 812. Each column of PEs computes $K_{pe}$ output channels to produce a tile of the output activation 810. The chip input activation 802 is further divided along input channel dimensions into processing element input activations 804, each with $C_{pe}$ input channels, and applied to different rows of processing elements on the chip 806, where they may be processed by $K_{chip}/K_{pe}$ processing elements to perform convolution operations in their vector multiply-accumulate units.

The chip 806 has a number of processing elements (e.g., 16). Each processing element stores a portion of the processing element weights 808 with $C_{pe}$ input channels and $K_{pe}$ output channels, for example a portion corresponding to a particular convolution filter window.

Each column of processing elements generates one of the processing element output activations 810, each being a portion of the chip output activation 812. The processing element output activations 810 are combined to generate the final chip output activation 812. Each processing element may utilize a temporal processing element-level tiling 900 of the input activations as depicted in FIG. 9 to generate a portion of one of the processing element output activations 810.

Referring to FIG. 9, a processing element-level tiling 900 for a weight-stationary dataflow comprises a temporal tile 902, a temporal tile 904, a temporal tile 906, a temporal tile 908, a temporal tile 910, and a temporal tile 912—in other words, a temporal progression. Each tile of the temporal progression shows a pairing of input activations and weights for dot product/partial sum calculation by the vector MAC units in a particular PE at a different clock cycle. "Partial sum" refers to an intermediate multiply-accumulate result in a dot-product-accumulate calculation.

The multiply-accumulate units of the processing element compute a portion of a wide dot-product-accumulate as a partial result and store the partial result in the accumulation memory buffer. Partial results from multiply-accumulate units are stored and accumulated in the accumulation buffer, and once all the accumulations for an entry in the accumulation buffer complete, the accumulated value is forwarded to neighboring processing elements for cross-processing element accumulation (further reduction), or sent to the local post-processor for post-processing. "Accumulation memory buffer" refers to a memory buffer utilized to store computational results of one or more multiply-accumulate units. Partial results are transformed into a final result by the post-processor and communicated to the global processing element. The global processing element may stage the final results between layers of the deep neural network.

The temporal tile 902 depicts a number of calculations performed at time, T=0. A first portion of the processing element input activation is convolved with a first portion of the processing element weights. The temporal tile 904 is a number of calculations performed at time, T=1. A second portion of the processing element input activation is convolved with the first portion of the processing element weights. This process continues for each portion of the processing element input activation until, in the temporal tile 906 at T=n−1, all portions of the processing element input activation have been convolved with a first portion of the processing element weights. The value "n" may correspond to the number of portions into which the processing element input activation is divided. In one embodiment, the processing element input activation may be divided into a number of rows and columns and each (row, column) iteration is calculated during one clock cycle, with a next iteration computed during the next clock cycle.

Once the iterations for the processing element input activation is completed for the first portion of the processing element weights, the processing element-level tiling 900 iterates on the processing element input activation with a second portion of the processing element weights (the temporal tile 908, the temporal tile 910, and the temporal tile 912). The temporal tile 908 is a number of calculations performed at time, T=n. The first portion of the processing element input activation is convolved with the second portion of the processing element weights. The temporal tile 910 is a number of calculations performed at time, T=n+1. The second portion of the processing element input activation is convolved with the second portion of the processing element weights. This process continues for each portion of the processing element input activation until, in the temporal tile 912 at T=2n−1, the last portion of the processing element input activation is convolved with the second portion of the processing element weights. The processing element input activation may be iterated similar to that as performed for the first portion of the processing element weights. The processing element-level tiling 900 may continue until each portion of processing element input activation is completed for each of the M portions of the processing element weights.

Figure 10:
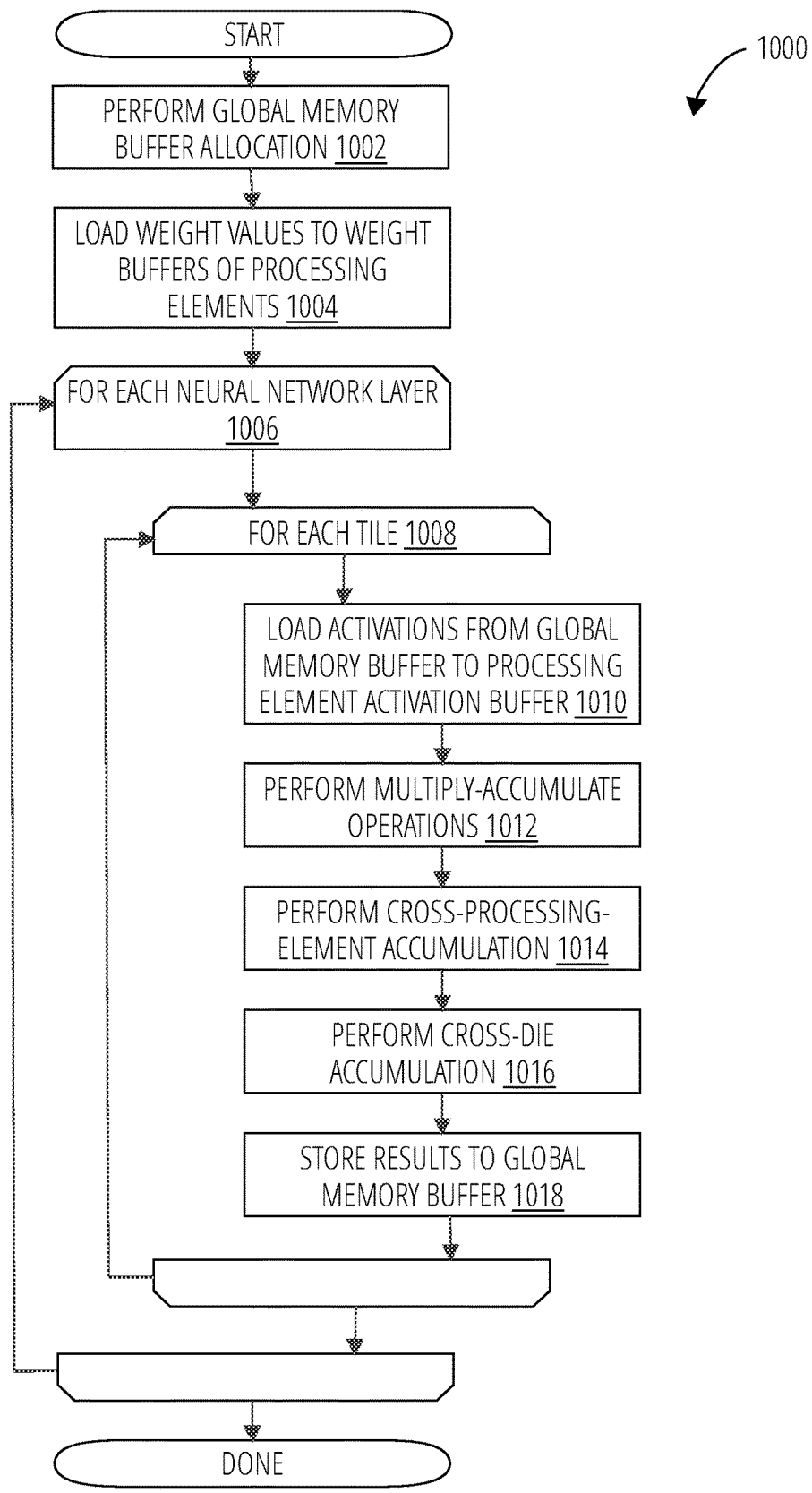
FIG. 10 depicts neural network processing 1000 in accordance with one embodiment.

FIG. 10 illustrates neural network processing 1000 on a multi-chip package in one embodiment. A global memory buffer allocation is made for each chip of the multi-chip package (block 1002), and the initial weight values of the neural network are distributed to the weight buffers of each of the processing elements on each of the chip of the multi-chip package (block 1004).

An outer loop then executes for each neural network layer (opening loop block 1006).

The inner loop (opening loop block 1008) executes the following for each tile:
1. load input activations from the global memory buffer to the level-one activation buffer of each processing element (block 1010);
2. perform multiply-accumulate operations (block 1012);

3. perform cross-processing element (intra-chip) accumulations (block 1014);
4. perform cross-chip accumulations (block 1016);
5. store results to global memory buffers (block 1018).

The global memory buffer allocation may be sequential or distributed. In a sequential allocation, input and output activations are allocated to consecutive memory addresses in the global memory buffer. In a distributed allocation, input and output activations are interleaved in the global memory buffer to maximally exploit locality.

Figure 11:
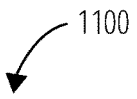
FIG. 11 illustrates a deeply-nested loop data flow 1100 in accordance with one embodiment.

FIG. 11 depicts an exemplary deeply-nested loop data flow 1100. Table 1 below depicts loop reordering that may be implemented for different types of data flows.

TABLE 1

|  | L10 | L11 | L12 | L20 | L21 | L22 | L23 | L24 | L25 | Loop Reordering |
|---|---|---|---|---|---|---|---|---|---|---|
| WS |  | 1 | 1 | 1 | Q1 | P1 | C1 | S | R | K1 | L20-L21 can be reordered L22-L25 can be reordered |
| OS |  | 1 | 1 | 1 | C1 | S | R | Q1 | P1 | K1 | L20-L22 can be reordered L23-L25 can be reordered |
| IS |  | 1 | 1 | 1 | S | R | K1 | C1 | W1 | H1 | L20-L22 can be reordered L23-L25 can be reordered |
| WS-LOS | C0 | R0 | S0 | Q1 | P1 | C1 | S1 | R1 | K1 | L20-L21 can be reordered L22-L25 can be reordered L10-L12 can be reordered |
| OS-LWS | Q0 | P0 | 1 | C1 | S | R | Q1 | P1 | K1 | L20-L22 can be reordered L23-L25 can be reordered L10-L11 can be reordered |

Additionally, an input activation collector can be used to improve input activation reuse along with weight and/or output reuse. For example when L20=R, L21=S, and L22=C1 . . . , input activations are accessed in a sliding window manner. This enables input activation reuse between consecutive iteration of L22 using an input activation collector (e.g., input collector 528).

FIG. 12-FIG. 16 depict various convolution computation data flows that may be implemented with embodiments of the described neural network acceleration architectures. A numeric postscript on a loop variable indicates the processing is carried out on the corresponding vector dimension by a particular processing element. The ordering of vector multiply-accumulate unit operations for the data flows is achieved by configuring the address generators to produce the correct sequence of addresses and applying them to the weight buffers and activation buffers of the processing elements. The amount of temporal reuse of operands of the multiply-accumulate units is controlled by the size of the various collectors. A larger collector size typically improves reuse in the collector registers, thereby reducing the energy consumption, but results in higher energy consumption in the collector registers themselves and can increase logic depth and timing sensitivity.

FIG. 12 depicts a weight-stationary data flow 1200 (WS), in which the outer loops (lines 1-4) reuse the weights across dimensions (R, S, K1, C1) with different input activation vectors to execute vector multiply-accumulate operations for convolution calculation in the inner loop (lines 6-7). To implement a deep neural network accelerator with a WS data flow in FIG. 12, the depth of the weight collector (WC) may be set to 1 and the depth of the accumulation collector (AC) may set to 0 (zero). The amount of weight reuse is determined by dimensions (P1, Q1), which can be programmed (configured) at run-time. Weight stationary data flows provide configurable levels of reuse of weight values by the multiply-accumulate units.

An output-stationary data flow 1300 (OS) is depicted in FIG. 13. An OS data flow for convolution computation may be implemented on the deep neural network accelerator by configuring the depth of WC to 0 (zero) and the depth of the AC to 1 (one). The amount of output reuse is determined by dimensions (R, S, C1), which can be programmed at run-time. Output stationary data flows provide configurable levels of reuse of computational results of the multiply-accumulate units.

Figure 14:
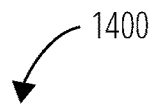
FIG. 14 depicts an input-stationary data flow 1400 in accordance with one embodiment.

An input-stationary data flow 1400 (IS) is depicted in FIG. 14. An IS data flow may be implemented for convolution computation by the deep neural network accelerator by configuring the depth of WC to 0 (zero) and the depth of the AC also to 0 (zero). The depth of the input collector (IC) is set to 1 (one). The amount of input reuse is determined by dimensions (K1, R, S), which can be programmed at run-time. Input stationary data flows provide configurable levels of reuse of input activation values by the multiply-accumulate units during convolution computation. The input-stationary data flow 1400 may also be referred to as an activation stationary data flow or convolution.

FIG. 15 depicts a weight-stationary-local-output-stationary data flow 1500 (WS-LOS) data flow, a type of multi-level WS-OS data flow for convolution computation. Unlike conventional data flows that are optimized for reuse of one operand only, multi-level data flows of this type can reuse both weights and outputs to configurable degrees. For example the weight-stationary-local-output-stationary data flow 1500 may reuse multiply-accumulate unit outputs in the innermost loop in a single-entry accumulation collector (AC=1), while reusing weights in the outer loops via a multi-entry weight collector (WC=C0>1). As depicted in the weight-stationary-local-output-stationary data flow 1500, outputs of the vector multiply-accumulate units are reused in the C0 loop while weights are reused in the P1 and Q1 loops.

FIG. 16 depicts an output-stationary-local-weight-stationary data flow 1600 (OS-LWS), another types of multi-level WS-OS convolution data flow. The OS-LWS data flow prioritizes weight reuse in the innermost loop (line 9) while providing vector multiply-accumulate unit output reuse in the outer loops (lines 5-7). In the depicted example, a single-entry weight collector and a multiple-entry accumulation collector of depth (AC=Q0>1) are configured to implement the output-stationary-local-weight-stationary data flow 1600.

Other multi-level data flow examples will be readily apparent to those of ordinary skill in the art based on these examples.

A neural network accelerator may thus be configured with logic (e.g., a memory configured with instructions, registers configured with settings) to configure a depth of the weight collection buffer, a depth of the accumulation collection buffer, and/or a depth of an input activation collection buffer to implement a deep neural network accelerator with any of a weight stationary convolution of the weights and activations, an output stationary convolution of the weights and activations, an activation stationary convolution of the weights and activations, and combinations of these data flow types.

The mechanisms disclosed herein may be implemented by computing devices utilizing one or more graphic processing unit (GPU) and/or general-purpose data processor (e.g., a 'central processing unit or CPU). Exemplary architectures will now be described that may be configured to carry out the techniques disclosed herein on such devices.

Referring to FIG. 17-FIG. 22, in one example, the input activations and weights are stored in a register file, and/or shared/global memory such as shared memory/L1 cache 2018, level two cache 1904, and/or memory 1704. This takes the place of the input activation buffer and weight buffer of the processing elements. Partial sum results may also be stored in a register file, and/or the shared memory/L1 cache 2018, level two cache 1904, and/or memory 1704. The vector multiply-accumulate units may be implemented in the tensor cores (see the description in conjunction with FIG. 20). The global buffer may be implemented for example by the level two cache 1904, or memory 1704.

One or more tensor cores are included in the core 2010 modules. The various collectors (e.g., weight collector, accumulation collector, and input collector) may be implemented in the tensor cores where the vector multiply-accumulate units are disposed to implement various dataflows. As explained before, WS, OS, and IS dataflows may utilize only a single-entry of weight collector, accumulation collector, and input collector respectively. Multi-level dataflow execution utilizes multiple collectors for data staging and reuse. For example, an OS-LWS dataflow utilizes a single-entry weight collector and multiple-entry accumulation collector. In addition, input collectors may be used to capture reuse of input activations. Both convolution and MMA operations may utilize multi-level dataflows to improve energy and/or execution efficiency. The register file 2008 (or files) or shared memory/L1 cache may operate as a weight buffer, input buffer, or accumulation buffer. One or more streaming multiprocessor 2000 may operate as the local processing element controller 410 and/or global processing element controller 608 to provide data orchestration across different levels of memory, and to provide sequencing of operations. The various address generators and buffer managers may be implemented for example by the M-pipe controller 1810 and/or memory management unit 1816 and may be configured based with instructions to generate a sequence of read/write addresses for input activations, weights and partial sums. The overall data paths may be carried out using parallel processing unit (see parallel processing unit 1700) operations performed by one or more streaming multiprocessor (see streaming multiprocessor 2000) data path.

The following description may use certain acronyms and abbreviations as follows:

"DPC" refers to a "data processing cluster";
"GPC" refers to a "general processing cluster";
"I/O" refers to a "input/output";
"L1 cache" refers to "level one cache";
"L2 cache" refers to "level two cache";
"LSU" refers to a "load/store unit";
"MMU" refers to a "memory management unit";
"MPC" refers to an "M-pipe controller";
"PPU" refers to a "parallel processing unit";
"PROP" refers to a "pre-raster operations unit";
"ROP" refers to a "raster operations";
"SFU" refers to a "special function unit";
"SM" refers to a "streaming multiprocessor";
"Viewport SCC" refers to "viewport scale, cull, and clip";
"WDX" refers to a "work distribution crossbar"; and.
"XBar" refers to a "crossbar".

Parallel Processing Unit

Figure 17:
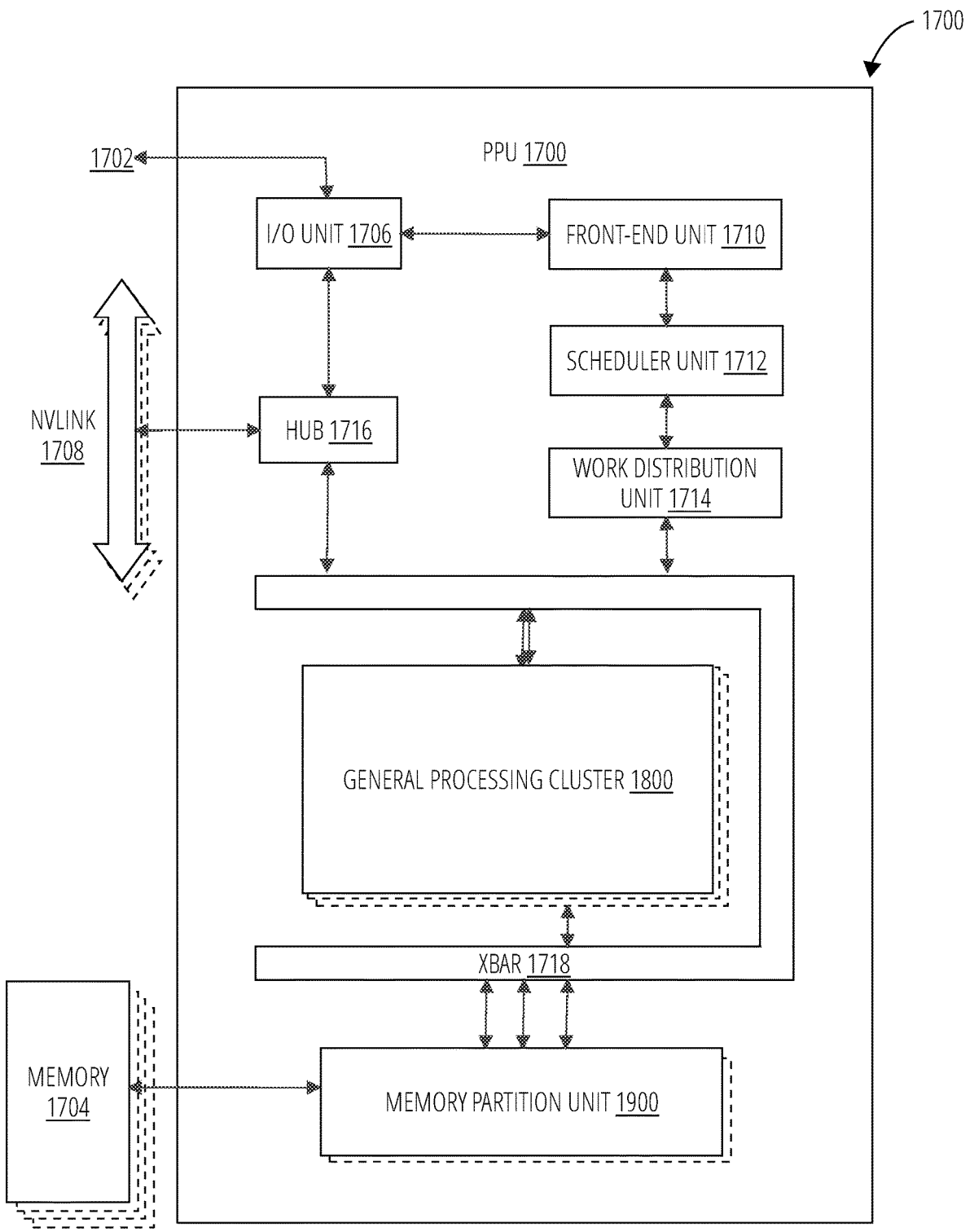
FIG. 17 depicts a parallel processing unit 1700 in accordance with one embodiment.

FIG. 17 depicts a parallel processing unit 1700, in accordance with an embodiment. In an embodiment, the parallel processing unit 1700 is a multi-threaded processor that is implemented on one or more integrated circuit devices. The parallel processing unit 1700 is a latency hiding architecture designed to process many threads in parallel. A thread (e.g., a thread of execution) is an instantiation of a set of instructions configured to be executed by the parallel processing unit 1700. In an embodiment, the parallel processing unit 1700 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the parallel processing unit 1700 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more parallel processing unit 1700 modules may be configured to accelerate thousands of High Performance Computing (HPC), data center, and machine learning applications. The parallel processing unit 1700 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 17, the parallel processing unit 1700 includes an I/O unit 1706, a front-end unit 1710, a scheduler unit 1712, a work distribution unit 1714, a hub 1716, a crossbar 1718, one or more general processing cluster 1800 modules, and one or more memory partition unit 1900 modules. The parallel processing unit 1700 may be connected to a host processor or other parallel processing unit 1700 modules via one or more high-speed NVLink 1708 interconnects. The parallel processing unit 1700 may be connected to a host processor or other peripheral devices via an interconnect 1702. The parallel processing unit 1700 may also be connected to a local memory comprising a number of memory 1704 devices. In an embodiment, the local memory may comprise a number of dynamic random access memory (DRAM) devices. The DRAM devices may be configured as a high-bandwidth memory (HBM) subsystem, with multiple DRAM dies stacked within each device. The memory 1704 may comprise logic to configure the parallel processing unit 1700 to carry out aspects of the techniques disclosed herein.

The NVLink 1708 interconnect enables systems to scale and include one or more parallel processing unit 1700 modules combined with one or more CPUs, supports cache coherence between the parallel processing unit 1700 modules and CPUs, and CPU mastering. Data and/or commands may be transmitted by the NVLink 1708 through the hub 1716 to/from other units of the parallel processing unit 1700 such as one or more copy engines, a video encoder, a video decoder, a power management unit, etc. (not explicitly shown). The NVLink 1708 is described in more detail in conjunction with FIG. 21.

The I/O unit 1706 is configured to transmit and receive communications (e.g., commands, data, etc.) from a host processor (not shown) over the interconnect 1702. The I/O unit 1706 may communicate with the host processor directly via the interconnect 1702 or through one or more intermediate devices such as a memory bridge. In an embodiment, the I/O unit 1706 may communicate with one or more other processors, such as one or more parallel processing unit 1700 modules via the interconnect 1702. In an embodiment, the I/O unit 1706 implements a Peripheral Component Interconnect Express (PCIe) interface for communications over a PCIe bus and the interconnect 1702 is a PCIe bus. In alternative embodiments, the I/O unit 1706 may implement other types of well-known interfaces for communicating with external devices.

The I/O unit 1706 decodes packets received via the interconnect 1702. In an embodiment, the packets represent commands configured to cause the parallel processing unit 1700 to perform various operations. The I/O unit 1706 transmits the decoded commands to various other units of the parallel processing unit 1700 as the commands may specify. For example, some commands may be transmitted to the front-end unit 1710. Other commands may be transmitted to the hub 1716 or other units of the parallel processing unit 1700 such as one or more copy engines, a video encoder, a video decoder, a power management unit, etc. (not explicitly shown). In other words, the I/O unit 1706 is configured to route communications between and among the various logical units of the parallel processing unit 1700.

In an embodiment, a program executed by the host processor encodes a command stream in a buffer that provides workloads to the parallel processing unit 1700 for processing. A workload may comprise several instructions and data to be processed by those instructions. The buffer is a region in a memory that is accessible (e.g., read/write) by both the host processor and the parallel processing unit 1700. For example, the I/O unit 1706 may be configured to access the buffer in a system memory connected to the interconnect 1702 via memory requests transmitted over the interconnect 1702. In an embodiment, the host processor writes the command stream to the buffer and then transmits a pointer to the start of the command stream to the parallel processing unit 1700. The front-end unit 1710 receives pointers to one or more command streams. The front-end unit 1710 manages the one or more streams, reading commands from the streams and forwarding commands to the various units of the parallel processing unit 1700.

The front-end unit 1710 is coupled to a scheduler unit 1712 that configures the various general processing cluster 1800 modules to process tasks defined by the one or more streams. The scheduler unit 1712 is configured to track state information related to the various tasks managed by the scheduler unit 1712. The state may indicate which general processing cluster 1800 a task is assigned to, whether the task is active or inactive, a priority level associated with the task, and so forth. The scheduler unit 1712 manages the execution of a plurality of tasks on the one or more general processing cluster 1800 modules.

The scheduler unit 1712 is coupled to a work distribution unit 1714 that is configured to dispatch tasks for execution on the general processing cluster 1800 modules. The work distribution unit 1714 may track a number of scheduled tasks received from the scheduler unit 1712. In an embodiment, the work distribution unit 1714 manages a pending task pool and an active task pool for each of the general processing cluster 1800 modules. The pending task pool may comprise a number of slots (e.g., 32 slots) that contain tasks assigned to be processed by a particular general processing cluster 1800. The active task pool may comprise a number of slots (e.g., 4 slots) for tasks that are actively being processed by the general processing cluster 1800 modules. As a general processing cluster 1800 finishes the execution of a task, that task is evicted from the active task pool for the general processing cluster 1800 and one of the other tasks from the pending task pool is selected and scheduled for execution on the general processing cluster 1800. If an active task has been idle on the general processing cluster 1800, such as while waiting for a data dependency to be resolved, then the active task may be evicted from the general processing cluster 1800 and returned to the pending task pool while another task in the pending task pool is selected and scheduled for execution on the general processing cluster 1800.

The work distribution unit 1714 communicates with the one or more general processing cluster 1800 modules via crossbar 1718. The crossbar 1718 is an interconnect network that couples many of the units of the parallel processing unit 1700 to other units of the parallel processing unit 1700. For example, the crossbar 1718 may be configured to couple the work distribution unit 1714 to a particular general processing cluster 1800. Although not shown explicitly, one or more other units of the parallel processing unit 1700 may also be connected to the crossbar 1718 via the hub 1716.

The tasks are managed by the scheduler unit 1712 and dispatched to a general processing cluster 1800 by the work distribution unit 1714. The general processing cluster 1800 is configured to process the task and generate results. The results may be consumed by other tasks within the general processing cluster 1800, routed to a different general processing cluster 1800 via the crossbar 1718, or stored in the memory 1704. The results can be written to the memory 1704 via the memory partition unit 1900 modules, which implement a memory interface for reading and writing data to/from the memory 1704. The results can be transmitted to another parallel processing unit 1700 or CPU via the NVLink 1708. In an embodiment, the parallel processing unit 1700 includes a number U of memory partition unit 1900 modules that is equal to the number of separate and distinct memory 1704 devices coupled to the parallel processing unit 1700. A memory partition unit 1900 will be described in more detail below in conjunction with FIG. 19.

In an embodiment, a host processor executes a driver kernel that implements an application programming interface (API) that enables one or more applications executing on the host processor to schedule operations for execution on the parallel processing unit 1700. In an embodiment, multiple compute applications are simultaneously executed by the parallel processing unit 1700 and the parallel processing unit 1700 provides isolation, quality of service (QoS), and independent address spaces for the multiple compute applications. An application may generate instructions (e.g., API calls) that cause the driver kernel to generate one or more tasks for execution by the parallel processing unit 1700. The driver kernel outputs tasks to one or more streams being processed by the parallel processing unit 1700. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 20.

Figure 18:
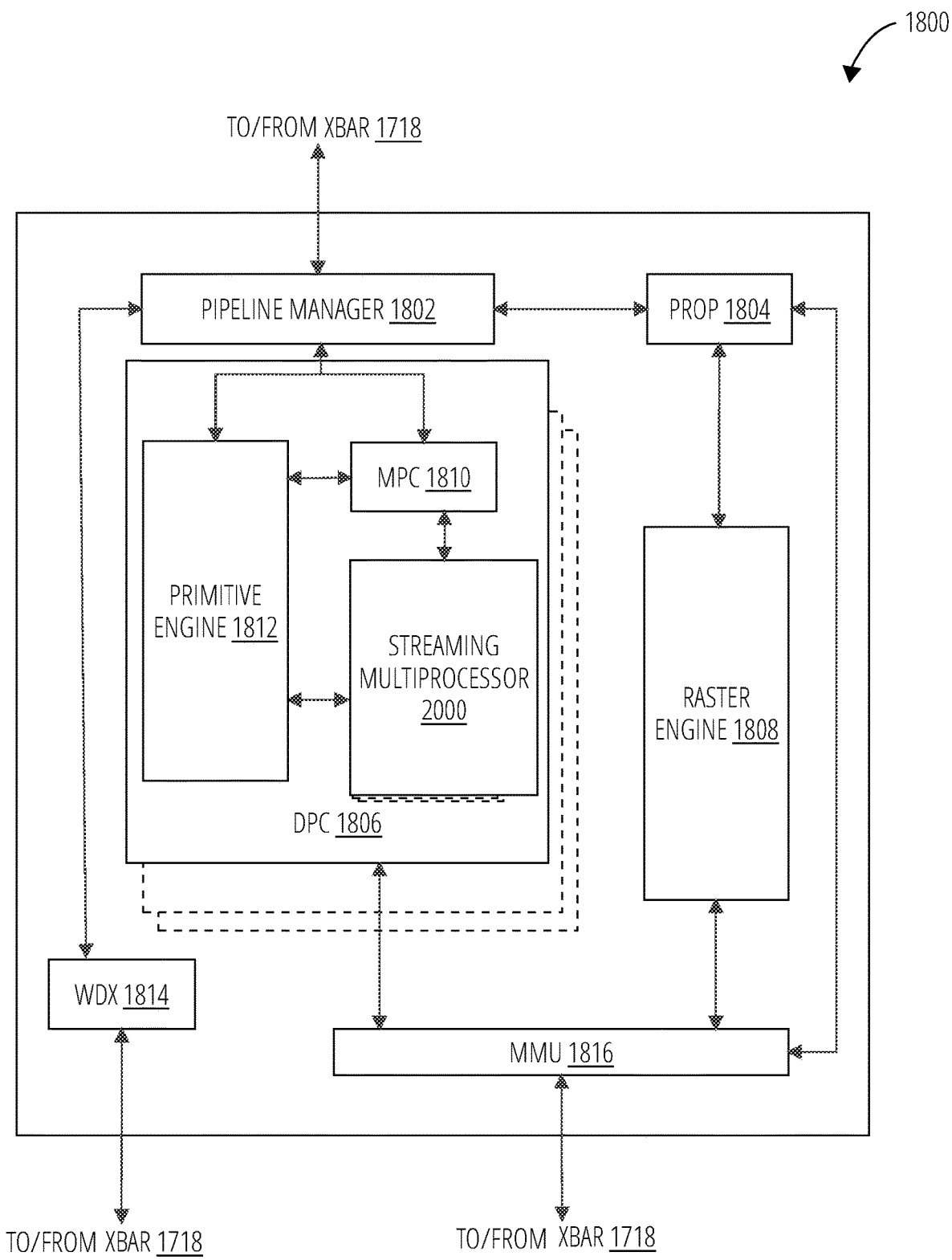
FIG. 18 depicts a general processing cluster 1800 in accordance with one embodiment.

FIG. 18 depicts a general processing cluster 1800 of the parallel processing unit 1700 of FIG. 17, in accordance with an embodiment. As shown in FIG. 18, each general processing cluster 1800 includes a number of hardware units for processing tasks. In an embodiment, each general processing cluster 1800 includes a pipeline manager 1802, a pre-raster operations unit 1804, a raster engine 1808, a work distribution crossbar 1814, a memory management unit 1816, and one or more data processing cluster 1806. It will be appreciated that the general processing cluster 1800 of FIG. 18 may include other hardware units in lieu of or in addition to the units shown in FIG. 18.

In an embodiment, the operation of the general processing cluster 1800 is controlled by the pipeline manager 1802. The pipeline manager 1802 manages the configuration of the one or more data processing cluster 1806 modules for processing tasks allocated to the general processing cluster 1800. In an embodiment, the pipeline manager 1802 may configure at least one of the one or more data processing cluster 1806 modules to implement at least a portion of a graphics rendering pipeline. For example, a data processing cluster 1806 may be configured to execute a vertex shader program on the programmable streaming multiprocessor 2000. The pipeline manager 1802 may also be configured to route packets received from the work distribution unit 1714 to the appropriate logical units within the general processing cluster 1800. For example, some packets may be routed to fixed function hardware units in the pre-raster operations unit 1804 and/or raster engine 1808 while other packets may be routed to the data processing cluster 1806 modules for processing by the primitive engine 1812 or the streaming multiprocessor 2000. In an embodiment, the pipeline manager 1802 may configure at least one of the one or more data processing cluster 1806 modules to implement a neural network model and/or a computing pipeline.

Figure 19:
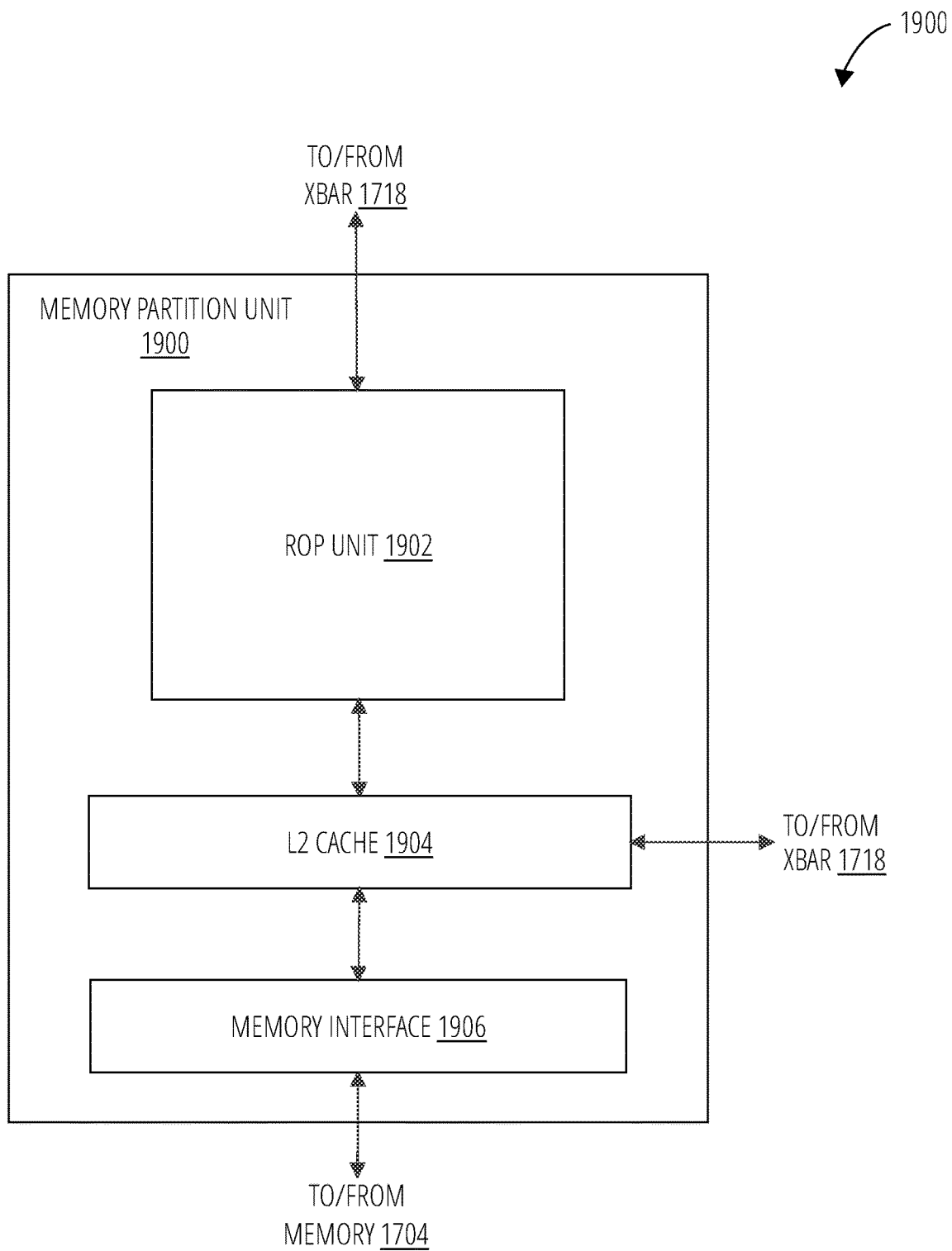
FIG. 19 depicts a memory partition unit 1900 in accordance with one embodiment.

The pre-raster operations unit 1804 is configured to route data generated by the raster engine 1808 and the data processing cluster 1806 modules to a Raster Operations (ROP) unit, described in more detail in conjunction with FIG. 19. The pre-raster operations unit 1804 may also be configured to perform optimizations for color blending, organize pixel data, perform address translations, and the like.

The raster engine 1808 includes a number of fixed function hardware units configured to perform various raster operations. In an embodiment, the raster engine 1808 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x, y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 1808 comprises fragments to be processed, for example, by a fragment shader implemented within a data processing cluster 1806.

Each data processing cluster 1806 included in the general processing cluster 1800 includes an M-pipe controller 1810, a primitive engine 1812, and one or more streaming multiprocessor 2000 modules. The M-pipe controller 1810 controls the operation of the data processing cluster 1806, routing packets received from the pipeline manager 1802 to the appropriate units in the data processing cluster 1806. For example, packets associated with a vertex may be routed to the primitive engine 1812, which is configured to fetch vertex attributes associated with the vertex from the memory 1704. In contrast, packets associated with a shader program may be transmitted to the streaming multiprocessor 2000.

The streaming multiprocessor 2000 comprises a programmable streaming processor that is configured to process tasks represented by a number of threads. Each streaming multiprocessor 2000 is multi-threaded and configured to execute a plurality of threads (e.g., 32 threads) from a particular group of threads concurrently. In an embodiment, the streaming multiprocessor 2000 implements a Single-Instruction, Multiple-Data (SIMD) architecture where each thread in a group of threads (e.g., a warp) is configured to process a different set of data based on the same set of instructions. All threads in the group of threads execute the same instructions. In another embodiment, the streaming multiprocessor 2000 implements a Single-Instruction, Multiple Thread (SIMT) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The streaming multiprocessor 2000 will be described in more detail below in conjunction with FIG. 20.

The memory management unit 1816 provides an interface between the general processing cluster 1800 and the memory partition unit 1900. The memory management unit 1816 may provide translation of virtual addresses into physical addresses, memory protection, and arbitration of memory requests. In an embodiment, the memory management unit 1816 provides one or more translation lookaside buffers (TLBs) for performing translation of virtual addresses into physical addresses in the memory 1704.

FIG. 19 depicts a memory partition unit 1900 of the parallel processing unit 1700 of FIG. 17, in accordance with an embodiment. As shown in FIG. 19, the memory partition unit 1900 includes a raster operations unit 1902, a level two cache 1904, and a memory interface 1906. The memory interface 1906 is coupled to the memory 1704. Memory interface 1906 may implement 32, 64, 128, 1024-bit data buses, or the like, for high-speed data transfer. In an embodiment, the parallel processing unit 1700 incorporates U memory interface 1906 modules, one memory interface 1906 per pair of memory partition unit 1900 modules, where each pair of memory partition unit 1900 modules is connected to a corresponding memory 1704 device. For example, parallel processing unit 1700 may be connected to up to Y memory 1704 devices, such as high bandwidth memory stacks or graphics double-data-rate, version 5, synchronous dynamic random access memory, or other types of persistent storage.

In an embodiment, the memory interface 1906 implements an HBM2 memory interface and Y equals half U. In an embodiment, the HBM2 memory stacks are located on the same physical package as the parallel processing unit 1700, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 1704 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where parallel processing unit 1700 modules process very large datasets and/or run applications for extended periods.

In an embodiment, the parallel processing unit 1700 implements a multi-level memory hierarchy. In an embodiment, the memory partition unit 1900 supports a unified memory to provide a single unified virtual address space for CPU and parallel processing unit 1700 memory, enabling data sharing between virtual memory systems. In an embodiment the frequency of accesses by a parallel processing unit 1700 to memory located on other processors is traced to ensure that memory pages are moved to the physical memory of the parallel processing unit 1700 that is accessing the pages more frequently. In an embodiment, the NVLink 1708 supports address translation services allowing the parallel processing unit 1700 to directly access a CPU's page tables and providing full access to CPU memory by the parallel processing unit 1700.

In an embodiment, copy engines transfer data between multiple parallel processing unit 1700 modules or between parallel processing unit 1700 modules and CPUs. The copy engines can generate page faults for addresses that are not mapped into the page tables. The memory partition unit 1900 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 1704 or other system memory may be fetched by the memory partition unit 1900 and stored in the level two cache 1904, which is located on-chip and is shared between the various general processing cluster 1800 modules. As shown, each memory partition unit 1900 includes a portion of the level two cache 1904 associated with a corresponding memory 1704 device. Lower level caches may then be implemented in various units within the general processing cluster 1800 modules. For example, each of the streaming multiprocessor 2000 modules may implement an L1 cache. The L1 cache is private memory that is dedicated to a particular streaming multiprocessor 2000. Data from the level two cache 1904 may be fetched and stored in each of the L1 caches for processing in the functional units of the streaming multiprocessor 2000 modules. The level two cache 1904 is coupled to the memory interface 1906 and the crossbar 1718.

The raster operations unit 1902 performs graphics raster operations related to pixel color, such as color compression, pixel blending, and the like. The raster operations unit 1902 also implements depth testing in conjunction with the raster engine 1808, receiving a depth for a sample location associated with a pixel fragment from the culling engine of the raster engine 1808. The depth is tested against a corresponding depth in a depth buffer for a sample location associated with the fragment. If the fragment passes the depth test for the sample location, then the raster operations unit 1902 updates the depth buffer and transmits a result of the depth test to the raster engine 1808. It will be appreciated that the number of partition memory partition unit 1900 modules may be different than the number of general processing cluster 1800 modules and, therefore, each raster operations unit 1902 may be coupled to each of the general processing cluster 1800 modules. The raster operations unit 1902 tracks packets received from the different general processing cluster 1800 modules and determines which general processing cluster 1800 that a result generated by the raster operations unit 1902 is routed to through the crossbar 1718. Although the raster operations unit 1902 is included within the memory partition unit 1900 in FIG. 19, in other embodiment, the raster operations unit 1902 may be outside of the memory partition unit 1900. For example, the raster operations unit 1902 may reside in the general processing cluster 1800 or another unit.

Figure 20:
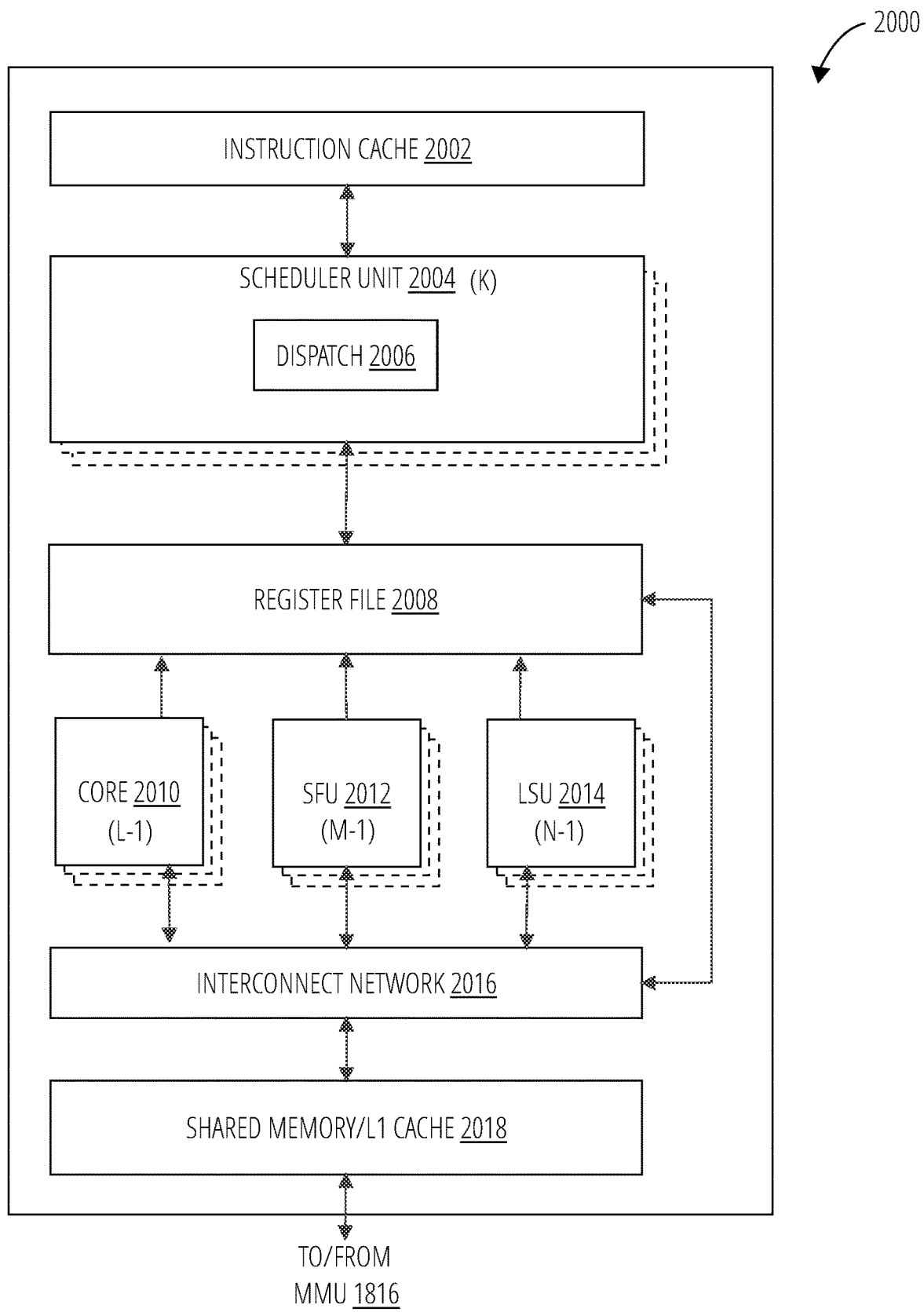
FIG. 20 depicts a streaming multiprocessor 2000 in accordance with one embodiment.

FIG. 20 illustrates the streaming multiprocessor 2000 of FIG. 18, in accordance with an embodiment. As shown in FIG. 20, the streaming multiprocessor 2000 includes an instruction cache 2002, one or more scheduler unit 2004 modules (e.g., such as scheduler unit 1712), a register file 2008, one or more processing core 2010 modules, one or more special function unit 2012 modules, one or more load/store unit 2014 modules, an interconnect network 2016, and a shared memory/L1 cache 2018.

As described above, the work distribution unit 1714 dispatches tasks for execution on the general processing cluster 1800 modules of the parallel processing unit 1700. The tasks are allocated to a particular data processing cluster 1806 within a general processing cluster 1800 and, if the task is associated with a shader program, the task may be allocated to a streaming multiprocessor 2000. The scheduler unit 1712 receives the tasks from the work distribution unit 1714 and manages instruction scheduling for one or more thread blocks assigned to the streaming multiprocessor 2000. The scheduler unit 2004 schedules thread blocks for execution as warps of parallel threads, where each thread block is allocated at least one warp. In an embodiment, each warp executes 32 threads. The scheduler unit 2004 may manage a plurality of different thread blocks, allocating the warps to the different thread blocks and then dispatching instructions from the plurality of different cooperative groups to the various functional units (e.g., core 2010 modules, special function unit 2012 modules, and load/store unit 2014 modules) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads ( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch 2006 unit is configured within the scheduler unit 2004 to transmit instructions to one or more of the functional units. In one embodiment, the scheduler unit 2004 includes two dispatch 2006 units that enable two different instructions from the same warp to be dispatched during each clock cycle. In alternative embodiments, each scheduler unit 2004 may include a single dispatch 2006 unit or additional dispatch 2006 units.

Each streaming multiprocessor 2000 includes a register file 2008 that provides a set of registers for the functional units of the streaming multiprocessor 2000. In an embodiment, the register file 2008 is divided between each of the functional units such that each functional unit is allocated a dedicated portion of the register file 2008. In another embodiment, the register file 2008 is divided between the different warps being executed by the streaming multiprocessor 2000. The register file 2008 provides temporary storage for operands connected to the data paths of the functional units.

Each streaming multiprocessor 2000 comprises L processing core 2010 modules. In an embodiment, the streaming multiprocessor 2000 includes a large number (e.g., 128, etc.) of distinct processing core 2010 modules. Each core 2010 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the core 2010 modules include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the core 2010 modules. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A'B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each streaming multiprocessor 2000 also comprises M special function unit 2012 modules that perform special functions (e.g., attribute evaluation, reciprocal square root, and the like). In an embodiment, the special function unit 2012 modules may include a tree traversal unit configured to traverse a hierarchical tree data structure. In an embodiment, the special function unit 2012 modules may include texture unit configured to perform texture map filtering operations. In an embodiment, the texture units are configured to load texture maps (e.g., a 2D array of texels) from the memory 1704 and sample the texture maps to produce sampled texture values for use in shader programs executed by the streaming multiprocessor 2000. In an embodiment, the texture maps are stored in the shared memory/L1 cache 2018. The texture units implement texture operations such as filtering operations using mip-maps (e.g., texture maps of varying levels of detail). In an embodiment, each streaming multiprocessor 2000 includes two texture units.

Each streaming multiprocessor 2000 also comprises N load/store unit 2014 modules that implement load and store operations between the shared memory/L1 cache 2018 and the register file 2008. Each streaming multiprocessor 2000 includes an interconnect network 2016 that connects each of the functional units to the register file 2008 and the load/store unit 2014 to the register file 2008 and shared memory/L1 cache 2018. In an embodiment, the interconnect network 2016 is a crossbar that can be configured to connect any of the functional units to any of the registers in the register file 2008 and connect the load/store unit 2014 modules to the register file 2008 and memory locations in shared memory/L1 cache 2018.

The shared memory/L1 cache 2018 is an array of on-chip memory that allows for data storage and communication between the streaming multiprocessor 2000 and the primitive engine 1812 and between threads in the streaming multiprocessor 2000. In an embodiment, the shared memory/L1 cache 2018 comprises 128 KB of storage capacity and is in the path from the streaming multiprocessor 2000 to the memory partition unit 1900. The shared memory/L1 cache 2018 can be used to cache reads and writes. One or more of the shared memory/L1 cache 2018, level two cache 1904, and memory 1704 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 2018 enables the shared memory/L1 cache 2018 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 17, are bypassed, creating a much simpler programming model. In the general purpose parallel computation configuration, the work distribution unit 1714 assigns and distributes blocks of threads directly to the data processing cluster 1806 modules. The threads in a block execute the same program, using a unique thread ID in the calculation to ensure each thread generates unique results, using the streaming multiprocessor 2000 to execute the program and perform calculations, shared memory/L1 cache 2018 to communicate between threads, and the load/store unit 2014 to read and write global memory through the shared memory/L1 cache 2018 and the memory partition unit 1900. When configured for general purpose parallel computation, the streaming multiprocessor 2000 can also write commands that the scheduler unit 1712 can use to launch new work on the data processing cluster 1806 modules.

The parallel processing unit 1700 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the parallel processing unit 1700 is embodied on a single semiconductor substrate. In another embodiment, the parallel processing unit 1700 is included in a system-on-a-chip (SoC) along with one or more other devices such as additional parallel processing unit 1700 modules, the memory 1704, a reduced instruction set computer (RISC) CPU, a memory management unit (MMU), a digital-to-analog converter (DAC), and the like.

In an embodiment, the parallel processing unit 1700 may be included on a graphics card that includes one or more memory devices 304. The graphics card may be configured to interface with a PCIe slot on a motherboard of a desktop computer. In yet another embodiment, the parallel processing unit 1700 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 21:
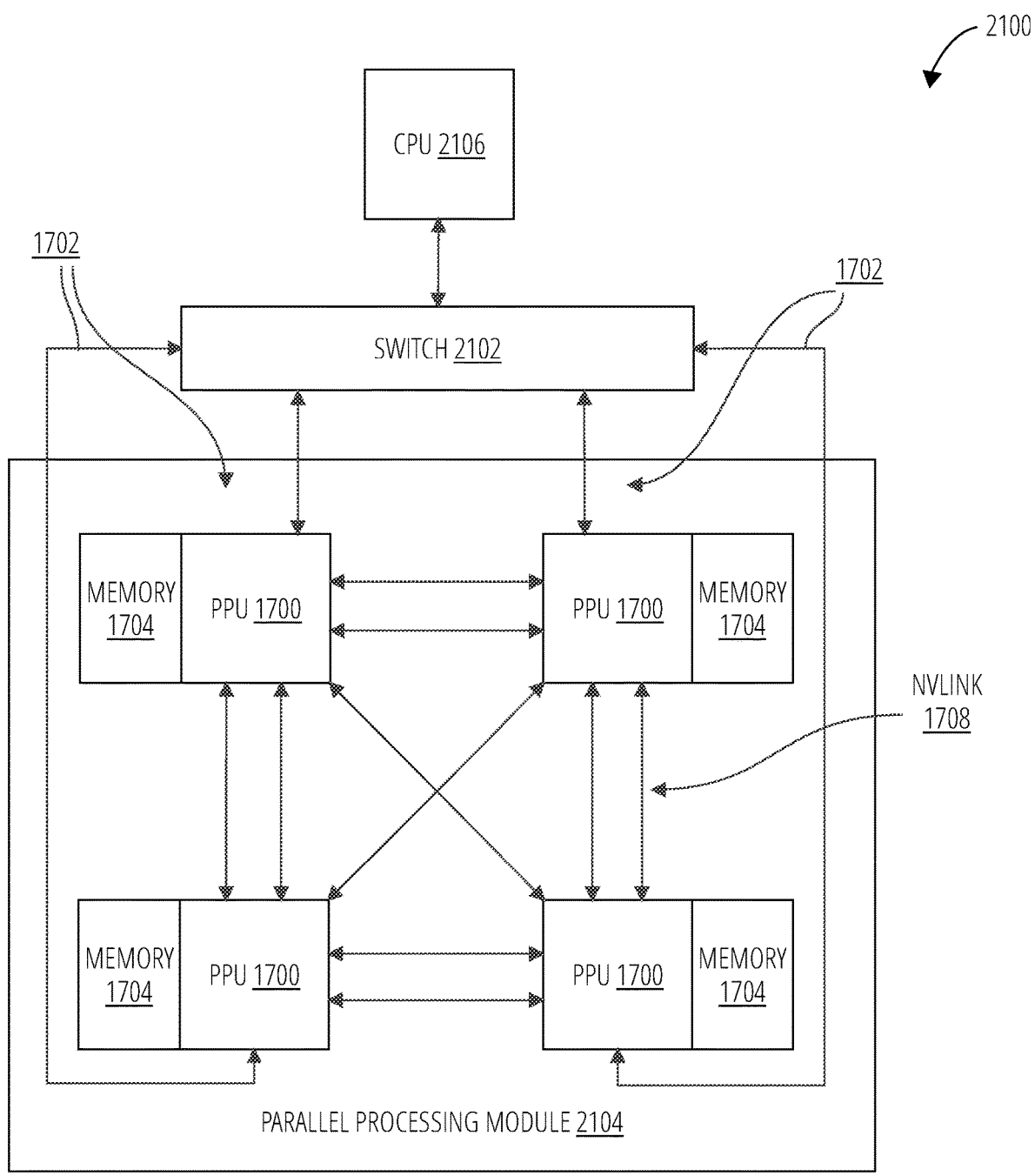
FIG. 21 depicts a processing system 2100 in accordance with one embodiment.

FIG. 21 is a conceptual diagram of a processing system 2100 implemented using the parallel processing unit 1700 of FIG. 17, in accordance with an embodiment. The processing system 2100 includes a central processing unit 2106, switch 2102, and multiple parallel processing unit 1700 modules each and respective memory 1704 modules. The NVLink 1708 provides high-speed communication links between each of the parallel processing unit 1700 modules. Although a particular number of NVLink 1708 and interconnect 1702 connections are illustrated in FIG. 21, the number of connections to each parallel processing unit 1700 and the central processing unit 2106 may vary. The switch 2102 interfaces between the interconnect 1702 and the central processing unit 2106. The parallel processing unit 1700 modules, memory 1704 modules, and NVLink 1708 connections may be situated on a single semiconductor platform to form a parallel processing module 2104. In an embodiment, the switch 2102 supports two or more protocols to interface between various different connections and/or links.

In another embodiment (not shown), the NVLink 1708 provides one or more high-speed communication links between each of the parallel processing unit 1700 modules and the central processing unit 2106 and the switch 2102 interfaces between the interconnect 1702 and each of the parallel processing unit 1700 modules. The parallel processing unit 1700 modules, memory 1704 modules, and interconnect 1702 may be situated on a single semiconductor platform to form a parallel processing module 2104. In yet another embodiment (not shown), the interconnect 1702 provides one or more communication links between each of the parallel processing unit 1700 modules and the central processing unit 2106 and the switch 2102 interfaces between each of the parallel processing unit 1700 modules using the NVLink 1708 to provide one or more high-speed communication links between the parallel processing unit 1700 modules. In another embodiment (not shown), the NVLink 1708 provides one or more high-speed communication links between the parallel processing unit 1700 modules and the central processing unit 2106 through the switch 2102. In yet another embodiment (not shown), the interconnect 1702 provides one or more communication links between each of the parallel processing unit 1700 modules directly. One or more of the NVLink 1708 high-speed communication links may be implemented as a physical NVLink interconnect or either an on-chip or on-die interconnect using the same protocol as the NVLink 1708.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 2104 may be implemented as a circuit board substrate and each of the parallel processing unit 1700 modules and/or memory 1704 modules may be packaged devices. In an embodiment, the central processing unit 2106, switch 2102, and the parallel processing module 2104 are situated on a single semiconductor platform.

In an embodiment, the signaling rate of each NVLink 1708 is 20 to 25 Gigabits/second and each parallel processing unit 1700 includes six NVLink 1708 interfaces (as shown in FIG. 21, five NVLink 1708 interfaces are included for each parallel processing unit 1700). Each NVLink 1708 provides a data transfer rate of 25 Gigabytes/second in each direction, with six links providing 300 Gigabytes/second. The NVLink 1708 can be used exclusively for PPU-to-PPU communication as shown in FIG. 21, or some combination of PPU-to-PPU and PPU-to-CPU, when the central processing unit 2106 also includes one or more NVLink 1708 interfaces.

In an embodiment, the NVLink 1708 allows direct load/store/atomic access from the central processing unit 2106 to each parallel processing unit 1700 module's memory 1704. In an embodiment, the NVLink 1708 supports coherency operations, allowing data read from the memory 1704 modules to be stored in the cache hierarchy of the central processing unit 2106, reducing cache access latency for the central processing unit 2106. In an embodiment, the NVLink 1708 includes support for Address Translation Services (ATS), allowing the parallel processing unit 1700 to directly access page tables within the central processing unit 2106.

One or more of the NVLink 1708 may also be configured to operate in a low-power mode.

Figure 22:
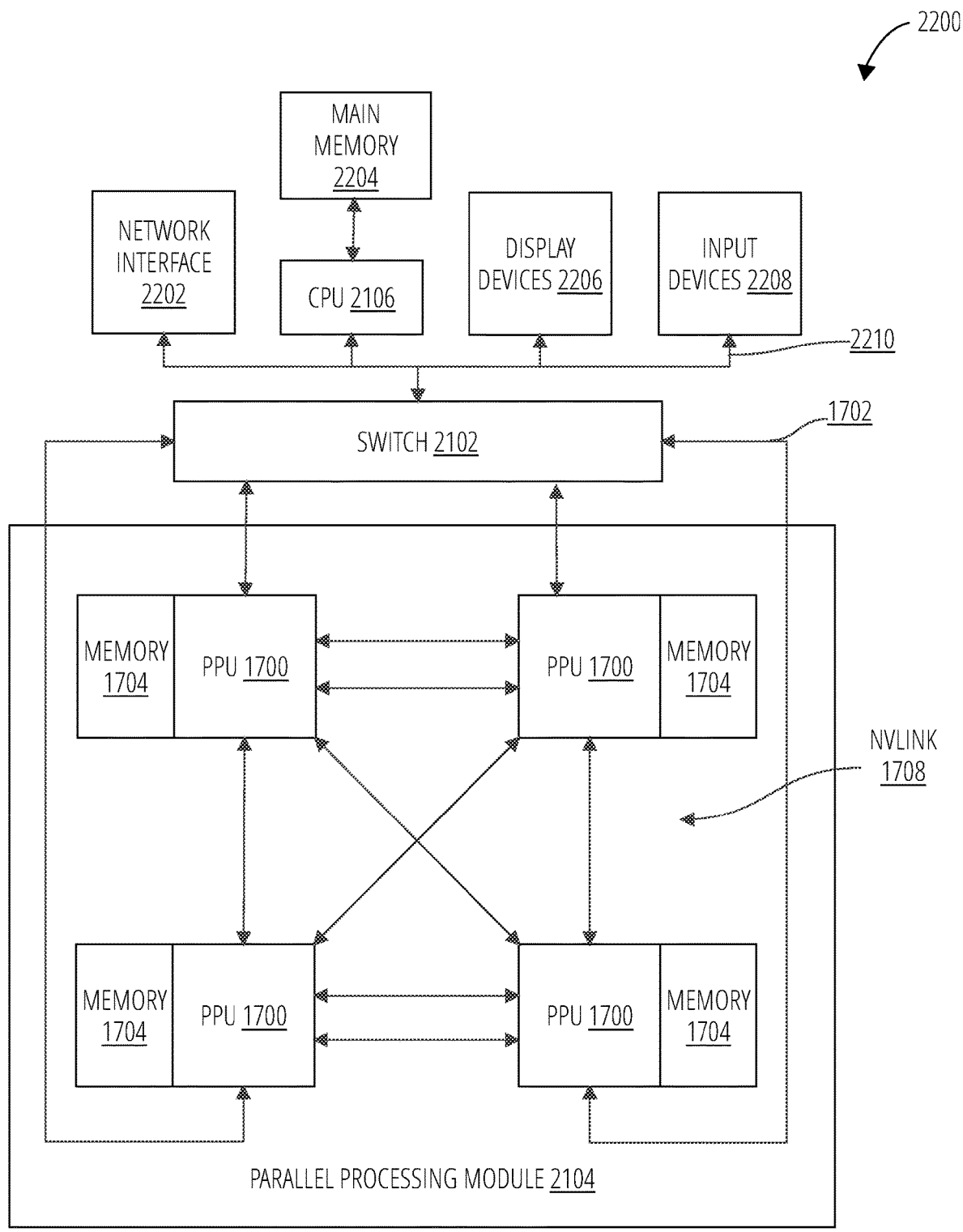
FIG. 22 depicts an exemplary processing system 2200 in accordance with another embodiment.

FIG. 22 depicts an exemplary processing system 2200 in which the various architecture and/or functionality of the various previous embodiments may be implemented. As shown, an exemplary processing system 2200 is provided including at least one central processing unit 2106 that is connected to a communications bus 2210. The communication communications bus 2210 may be implemented using any suitable protocol, such as PCI (Peripheral Component Interconnect), PCI-Express, AGP (Accelerated Graphics Port), HyperTransport, or any other bus or point-to-point communication protocol(s). The exemplary processing system 2200 also includes a main memory 2204. Control logic (software) and data are stored in the main memory 2204 which may take the form of random access memory (RAM).

The exemplary processing system 2200 also includes input devices 2208, the parallel processing module 2104, and display devices 2206, e.g. a conventional CRT (cathode ray tube), LCD (liquid crystal display), LED (light emitting diode), plasma display or the like. User input may be received from the input devices 2208, e.g., keyboard, mouse, touchpad, microphone, and the like. Each of the foregoing modules and/or devices may even be situated on a single semiconductor platform to form the exemplary processing system 2200. Alternately, the various modules may also be situated separately or in various combinations of semiconductor platforms per the desires of the user.

Further, the exemplary processing system 2200 may be coupled to a network (e.g., a telecommunications network, local area network (LAN), wireless network, wide area network (WAN) such as the Internet, peer-to-peer network, cable network, or the like) through a network interface 2202 for communication purposes.

The exemplary processing system 2200 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 2204 and/or the secondary storage. Such computer programs, when executed, enable the exemplary processing system 2200 to perform various functions. The main memory 2204, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the exemplary processing system 2200 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

"Logic" is used herein to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112 (f) for that claim element. Accordingly, claims in this application that do not otherwise include the "means for" [performing a function] construct should not be interpreted under 35 U.S.C § 112 (f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

Having thus described illustrative embodiments in detail, it will be apparent that modifications and variations are possible without departing from the scope of the invention as claimed.

What is claimed is:

1. A data processor comprising:
a plurality of processing elements, each comprising:
a weight buffer;
an activation buffer;
an accumulation memory buffer;
a plurality of vector multiply-accumulate units configured to compute in parallel a convolution of weights from the weight buffer and activations from the activation buffer, each of the vector multiply-accumulate units comprising:
a first collector disposed between the vector multiply-accumulate unit and the weight buffer; and
a second collector disposed between the vector multiply-accumulate unit and the accumulation memory buffer; and
configuration logic to configure a depth of the collectors to adjust a level of data-stationary computation of the convolution.

2. The data processor of claim 1, further comprising:
the configuration logic to configure a depth of the first collector on one or more of the vector multiply-accumulate units to adjust a level of weight-stationary computation of the convolution.

3. The data processor of claim 1, further comprising:
the configuration logic to configure a depth of the second collector on one or more of the vector multiply-accumulate units to adjust a level of output-stationary computation of the convolution.

4. The data processor of claim 1, further comprising:
the configuration logic to configure one or both of a depth of the first collector and a depth of the second collector on one or more of the vector multiply-accumulate units to implement one or more of multi-level weight-stationary computation and output-stationary computation of the convolution.

5. The data processor of claim 1, the processing elements further comprising:
a third collector disposed between the activation buffer and the vector multiply-accumulate units.

6. The data processor of claim 5, further comprising:
the configuration logic to configure a depth of the third collector to adjust a level of input-stationary computation of the convolution.

7. The data processor of claim 5, further comprising:
the configuration logic to configure one or more of a depth of the first collector, a depth of the second collector, and a depth of the third collector of one or more of the vector multiply-accumulate units to implement one or more of multi-level weight-stationary, output-stationary, and input stationary computation of the convolution.

8. The data processor of claim 1, further comprising:
a global memory; buffer; and
the configuration logic to configure the processing elements to utilize the global memory buffer to store the activations and to apply the activations between layers of a neural network.

9. The data processor of claim 1, further comprising:
the configuration logic to configure one or more of the vector multiply-accumulate units to compute a portion of the convolution as a partial result and to forward the partial result from the accumulation memory buffer to neighboring processing elements.

10. The data processor of claim 1, further comprising:
the configuration logic to distribute the weights and the activations among the processing elements spatially by a depth of an input of a neural network, and temporally by a height and a width of the input to the neural network.

11. The data processor of claim 1, further comprising:
the configuration logic to distribute the weights and the activations among the processing elements spatially and temporally by configurable combinations of input dimensions of a neural network and dimensions of the weights.

12. A neural network computation method comprising:
distributing weight values and activation values for a neural network computation among a plurality of processing elements of the neural network spatially by a depth of an input to the neural network, and temporally by a height and a width of the input to the neural network;
configuring a depth of at least one collector of a plurality of vector multiply-accumulate units of the processing elements to implement a stationary data flow by the vector multiply-accumulate units during the neural network computation.

13. The neural network computation method of claim 12, wherein the stationary data flow is a weigh-stationary data flow.

14. The neural network computation method of claim 12, wherein the data flow is an output-stationary data flow.

15. A neural network computation method comprising:
distributing weight values and activation values for a neural network computation among a plurality of processing elements of the neural network spatially and temporally by configurable combinations of different dimensions of inputs to the neural network and weights of the neural network; and
configuring a depth of at least one collector of a plurality of vector multiply-accumulate units of a plurality of processing elements to implement a stationary data flow by the vector multiply-accumulate units during the neural network computation.

* * * * *